United States Patent [19]

Kawakatsu et al.

[11] 4,305,254
[45] Dec. 15, 1981

[54] CONTROL APPARATUS AND METHOD FOR ENGINE/ELECTRIC HYBRID VEHICLE

[75] Inventors: Shiro Kawakatsu, Suita; Shoji Honda, Toyonaka, both of Japan

[73] Assignee: Daihatsu Motor Co., Ltd., Ikeda, Japan

[21] Appl. No.: 123,057

[22] Filed: Feb. 20, 1980

[51] Int. Cl.³ ............................................. F02B 73/00
[52] U.S. Cl. ...................................... 60/716; 60/711; 180/65 A; 290/45
[58] Field of Search ................. 60/698, 706, 709, 711, 60/716, 718; 180/65 A, 65 R; 290/17, 45

[56] References Cited

U.S. PATENT DOCUMENTS

| | | | |
|---|---|---|---|
| 3,503,464 | 3/1970 | Yardney | 180/65 A |
| 3,561,557 | 2/1971 | Magnuson et al. | 180/65 A |
| 3,923,115 | 12/1975 | Helling | 180/65 A |

Primary Examiner—Allen M. Ostrager
Assistant Examiner—Stephen F. Husar
Attorney, Agent, or Firm—Darby & Darby

[57] ABSTRACT

A hybrid vehicle comprises an internal combustion engine and a motor/generator, which are controlled by a microcomputer. The internal combustion engine is rendered capable of a running operation in a region of a better fuel consumption characteristic. Outside the above described region, the motor is cooperatively driven with the internal combustion engine to provide a driving torque or only the motor is energized by a battery to provide a driving torque. On the other hand, when the hybrid vehicle is driven with a torque smaller than a predetermined lower limit value of the torque of the internal combustion engine, the redundant torque is used to drive the generator, so that a regenerative power is absorbed by the battery.

35 Claims, 22 Drawing Figures

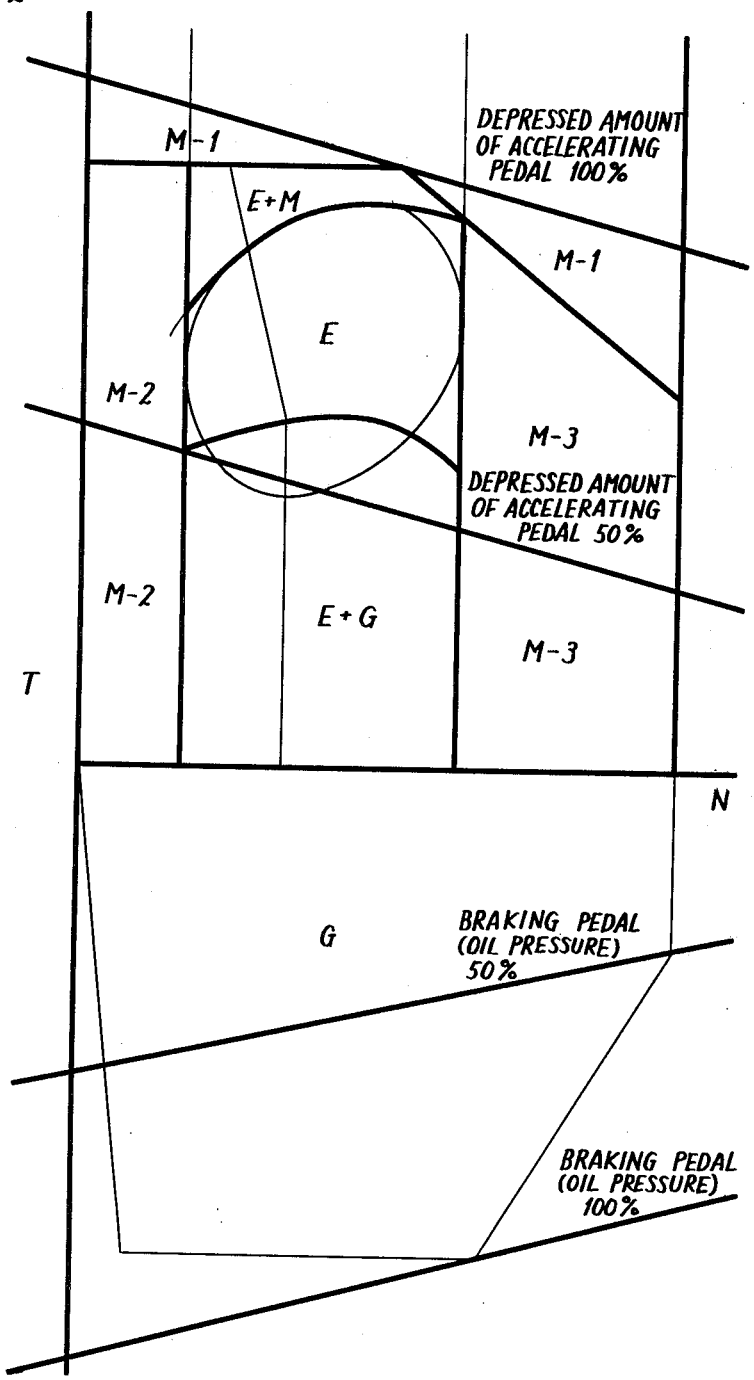

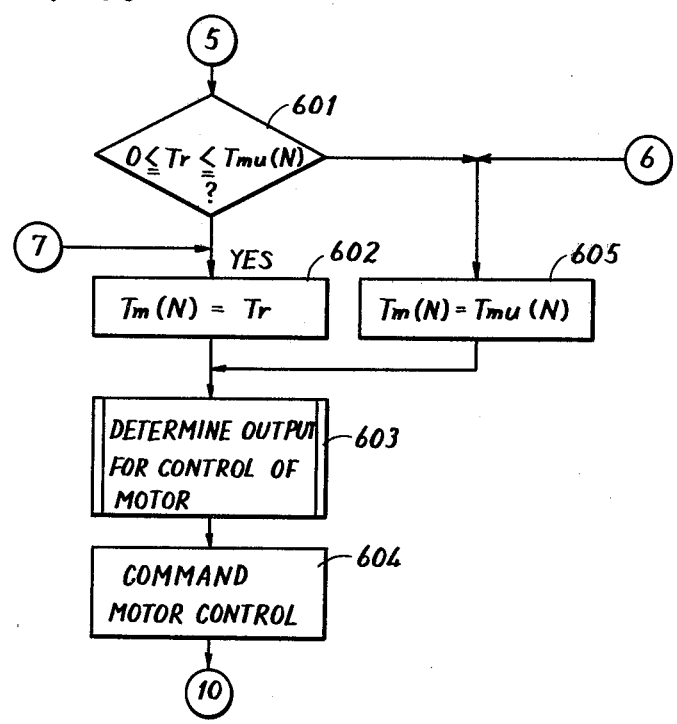

CONTROL APPARATUS AND METHOD FOR ENGINE/ELECTRIC HYBRID VEHICLE

BACKGROUND OF THE INVENTION

1. Field of the Invention;

The present invention relates to an apparatus and method for controlling an engine/electric hybrid vehicle. More specifically, the present invention relates to an apparatus and method for controlling an engine/electric hybrid vehicle for performing an improved fuel consumption efficiency.

2. Description of the Prior Art;

An electric vehicle has been considered as one of the most effective transportation means by virtue of freedom from pollution as compared with vehicles employing any other conventional prime movers. On the other hand, however, such electric vehicle suffers from various disadvantages that a long period of time is required for charging a battery, a continual running distance and time are short and so on. In view of the foregoing, an engine/electric hybrid vehicle implemented as an internal combustion engine borne electric vehicle has been proposed and put into practical use for the purpose of eliminating the above described disadvantages without losing the advantages proper of an electric vehicle. Naturally such engine/electric hybrid vehicle consumes a fuel in an engine running mode and consumes electric power in a motor running mode.

With the recent aggravation of an oil situation, an automobile of the least possible fuel consumption has been desired. In addition, it is also desired that an exhaust gas is purer inasmuch as such an exhaust gas from an engine is one cause of air pollution. It has been well-known that an exhaust gas from an engine is purer when an engine efficiency is better.

SUMMARY OF THE INVENTION

Briefly described, the present invention comprises a hybrid vehicle including an internal combustion engine and a motor being energized by a battery, adapted such that only the internal combustion engine is rendered capable of a running operation in a region of a better fuel consumption characteristic and outside the above described region the motor is mainly used as a prime mover. Preferably, the vehicle is further adapted such that in a region where a required torque is larger than an upper limit of a predetermined torque range allowing for a running operation of the internal combustion engine the internal combustion engine is rendered capable of a running operation at the upper limit of the allowable torque range at least at a portion of such range, while the deficient torque is obtained from the motor being energized by the battery. Preferably, the vehicle is further adapted such that if the required torque can be obtained only by the internal combustion engine, only the internal combustion engine is used as a prime mover.

According to the present invention, since the internal combustion engine is run only in a region where a fuel consumption is less or a thermal efficiency is better, a fuel efficiency of the internal combustion engine is improved. Accordingly, a hybrid vehicle is provided which is most suited for a demand of suppressing a fuel consumption in the light of the recent aggravation of an oil situation. Meanwhile, outside the above described running operation allowable range of the internal combustion engine, the motor is also used as a prime mover. As a result, a required number of revolutions and required torque can be attained throughout a full range with stability.

According to a preferred embodiment of the present invention, the motor is also structured to be operable as a generator and the vehicle is further adapted such that in the case where the number of revolutions is within a predetermined revolution number range allowing for a running operation of the internal combustion engine and the required torque is lower than a lower limit value of the torque range allowing for a running operation of the internal combustion engine and the sign thereof is plus, the internal combustion engine is run with the lower limit value of the above described allowable torque range and the redundant torque is absorbed by the generator, so that the output generated by the generator is regenerated to the battery. Therefore, a hybrid vehicle is provided wherein a demand of saving energy can be achieved. More specifically, even in the case where the required torque is smaller than the lower limit of the above described allowable torque range of the internal combustion engine, degradation of a fuel consumption characteristic is avoided by running the internal combustion engine with the lower limit torque and the redundant torque is absorbed by the generator, with the result that always a torque corresponding to a the required torque is obtained. The generated output obtained as a result of running of the generator is regenerated to the battery without being wastefully consumed and loss of generated electric power is avoided. As a result, as a whole, the demand of saving energy can be met.

Accordingly, a principal object of the present invention is to provide an improved apparatus and method for controlling a hybrid vehicle.

Another object of the present invention is to provide a hybrid vehicle wherein a fuel consumption by an internal combustion engine can be minimized.

A further object of the present invention is to provide a hybrid vehicle which achieves the best energy saving effect as a whole.

Still a further object of the present invention is to provide a hybrid vehicle, wherein an exhaust gas exhausted from the internal combustion engine is purer.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a graph showing the respective operating regions for explaining the principle of the present invention, wherein the abscissa indicates the number of shaft revolutions and the ordinate indicates the shaft torque;

FIGS. 10, 11A to 11E, 12A, 12B, 13A to 13C, 14A and 14B are flow diagrams for explaining the operation of the present invention.

DESCRIPTION OF THE PREFERRED EMBODIMENTS

Figure 1:
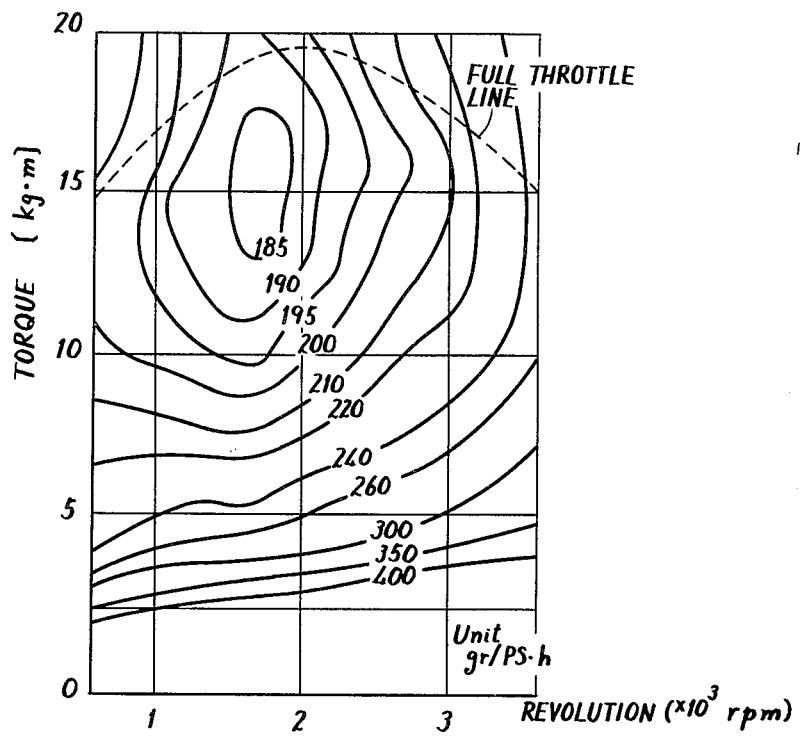
FIG. 1 is a graph showing one example of a fuel consumption characteristic of a certain type of an internal combustion engine, particularly a diesel engine, for explaining the principle of the present invention, wherein abscissa indicates the number of shaft revolutions ($\times 10^3$ rpm) and the ordinate indicates the axis torque (kg·m)

FIG. 1 is a graph showing one example of a fuel consumption characteristic of a given kind of an internal combustion engine (simply referred to as an engine hereinafter) for depicting the principle of the present invention, wherein the abscissa indicates the number of revolution of the shaft of the engine ($\times 10^3$rpm) and the ordinate indicates the shaft torque (kg·m). Such a graph showing a fuel consumption characteristic is well-known as a map of specific fuel consumption. More specifically, by taking an example of the FIG. 1 graph, the fuel consumption or thermal efficiency is the best if and when the engine is run within the range of the specific fuel consumption (gr/PS·h) being "185". The present invention performs such a control that an engine borne on a hybrid vehicle is used within a region of a relatively better thermal efficiency based on the specific fuel consumption as shown in FIG. 1, for example only the engine is used as a prime mover of the vehicle if and when the number of revolution and the torque reside in the range of the specific fuel consumption being less than approximately 190 (gr/PS·h), for example, and only the motor is used as a prime mover or both the motor and the engine are used as a prime mover of the vehicle if and when the torque resides outside the above described range.

FIG. 2 is another graph for depicting the principle of the present invention, wherein the abscissa indicates the number of revolution of the shaft and the ordinate indicates the shaft torque. Referring to FIG. 2, the principle of the present invention will be described in detail.

More specifically, referring to FIG. 2, within the range of the region E (which is an approximate portion of the region of the specific fuel consumption (gr/PS·h) being less than "190", for example) only an internal combustion engine borne on a hybrid vehicle is run as a prime mover. The region E is a region defined by an upper limit line of a curve representing a throttle opening degree characteristic running through a portion of the region of the specific fuel consumption being less than 190(gr/PS·h), i.e. a line of the throttle opening degree being 100%, and a line of the throttle opening degree being 50%, and also defined by an upper limit value Neu and a lower limit value Nel of the range of the number of revolutions of the engine. Meanwhile, it is pointed out that even within the region E a region where a fuel consumption is worse than 190(gr/PS·h) is included and furthermore it could happen that some portion is within the range of the fuel cunsumption being less than 190(gr/PS·h) but outside the region E. The reason is that the curve of the fuel consumption does not necessarily coincide with the curve of the throttle opening degree characteristic and a region of a better thermal efficiency was selected in an approximate manner in determining the region E. According to the embodiment, only a motor/generator borne on the hybrid vehicle is run as a motor to provide a prime mover within the regions M-1, M-2 and M-3. Meanwhile, although the region M-1 is a region exceeding the upper limit value Tmu(N) of a motoring torque Tm(N), the motor/generator is controlled such that the motoring torque is used as the upper limit value (Tmu(N)) within the above described region M-1. The region M-2 is a region where the number of shaft revolutions N obtained responsive to the speed of the movement of the vehicle is smaller than the lower limit value Nel of the number of revolutions of the engine, whereas the region M-3 is a region where the number of shaft revolutions N is larger than the upper limit value Neu of the number of revolutions of the engine. Furthermore the region M+E shows a region where the above described number of shaft revolutions N associated with the speed of the vehicle is larger than the lower limit value Nel and smaller than the upper limit value Neu, where the required torque Tr is smaller than the upper limit value Tmu(N) of the motoring torque and is larger than the upper limit value Teu(N) of the engine torque. Within the region M+E, both the internal combustion engine and the motor are used as a prime mover. Within the region G the above described motor/generator is run as a generator. Furthermore, the region E+G is a region where the number of shaft revolutions N associated with the speed of the vehicle is larger than the lower limit value Nel and smaller than the upper limit value Neu and the required torque Tr lies between the lower limit value Tel(N) and zero of the engine torque. Within the region E+G, the engine is run as a prime mover and the redundant torque is absorbed by running the motor/generator as a generator. If and when an engine and a motor/generator of an engine/electric hybrid vehicle are controlled in a manner unique to each mode in the respective modes shown in FIG. 2, an improved engine/electric hybrid vehicle can be provided in which a fuel consumption by the engine is minimized and the energy loss by the motor/generator is also minimized.

Figure 3:
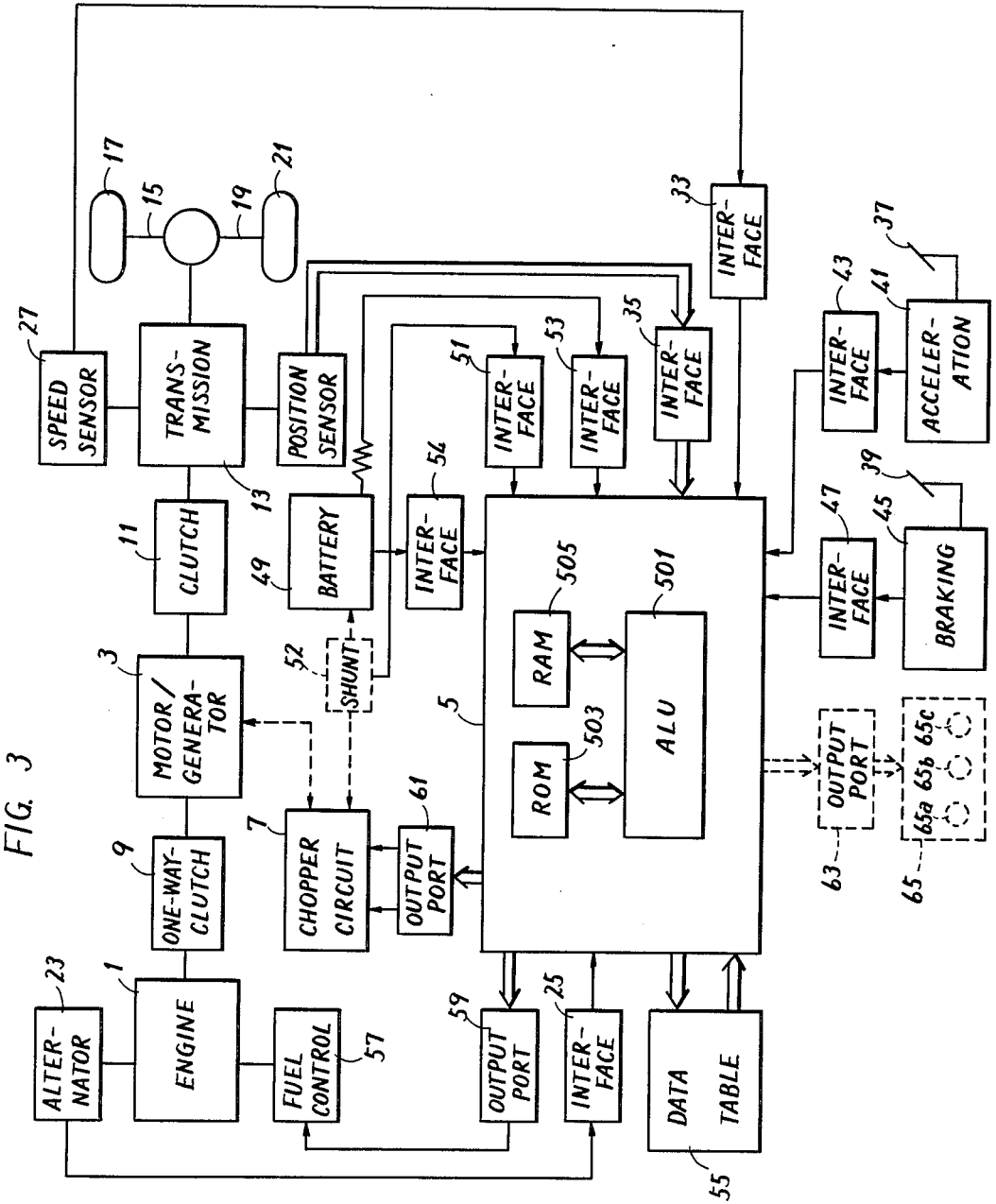
FIG. 3 is a block diagram showing one embodiment of the present invention.
Figure 5:
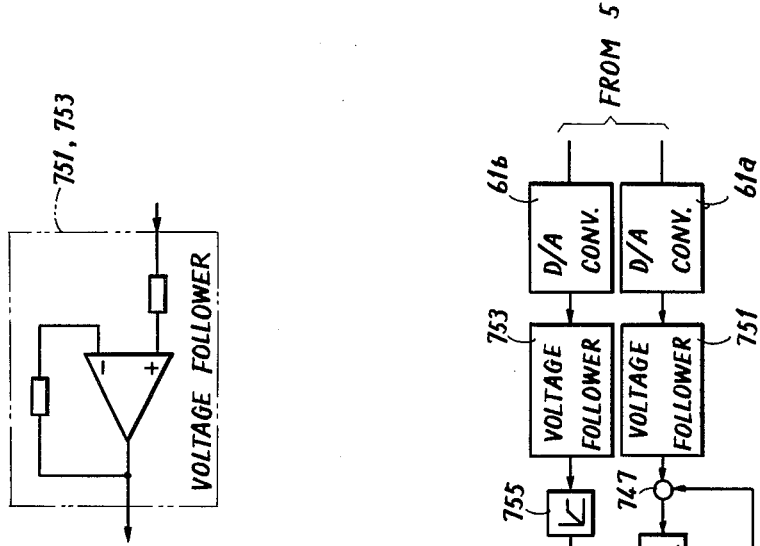
FIG. 5 is a schematic diagram showing one example of a voltage follower for use in the FIG. 4 embodiment.

FIG. 3 is a block diagram showing one embodiment of the present invention. The embodiment shown is directed to an engine/electric hybrid vehicle comprising an engine 1 and a motor/generator 3. The engine 1 and the motor/generator 3 are coupled to be controlled by a microcomputer 5. In particular, the motor/generator 3 is coupled such that a chopper circuit 7 is controlled by the microcomputer 5.

The engine 1 is structured to exhibit a specific fuel consumption characteristic as shown in FIG. 1 and the output shaft of the engine 1 is coupled to the shaft of the motor/generator 3 through a one-way-clutch 9. The output shaft of the motor/generator 3 is coupled to a transmission 13 through a manual clutch 11. The output shaft of the transmission 13 is coupled through a transmission means such as a differential gear to a wheel shaft 15 and thus to a wheel 17 and to a wheel shaft 19 and thus to a wheel 21.

An alternator 23 for charging a battery, not shown, for auxiliary components is coupled to the engine 1. As well known, the alternator 23 generates a voltage of the magnitude associated with the number of revolutions of the engine 1. The output from the alternator 23 is applied to an interface 25. The interface 25 is adapted to provide an output of three stages, for example, in association with the output voltage signal obtained from the alternator 23. More specifically, the interface 25 is adapted to provide a low level voltage of such as 0 V when the engine 1 has been brought to a stop, a medium level voltage when the engine 1 has been placed in an idling state, and a high level voltage when the engine 1 has been placed in a relatively high speed revolution state as compared with the idling state. The output from the interface 25 is applied to the microcomputer 5 as one input thereto.

A speed sensor 27 and a position sensor 29 are operatively coupled to the transmission 13. The speed sensor 27 is operatively coupled to the output shaft of the transmission 13, for example, so that pulses of a pulse repetition frequency associated with the number of revolutions Nv determined as a function of the speed of the vehicle. More specifically, a cable, not shown, of a speed meter is coupled to the output shaft of the transmission 13 for the purpose of detecting the speed of the vehicle and the speed sensor 27 is structured to generate pulses of a pulse repetition frequency associated with the number of revolutions Nv responsive to the rotation of the cable of the speed meter. The number of revolutions Nv(rpm) determinable as a function of the speed of the vehicle has been unified under the Japanese Industrial Standard, for example, such that the number of revolutions may be the same for the same speed in any types of the vehicles. The Japanese Industrial Standard stipulates Nv=637×V/60(rpm). More specifically, according to the Japanese Industrial Standard, it has been stipulated that the number of revolutions Nv determinable as a function of the speed of the vehicle may be 637 rpm in the case where the speed V of the vehicle is 60 km/h. Meanwhile, the number of revolutions Na of the output shaft of the transmission 13 and the number of revolutions Nv associated with the speed of the vehicle has a relation defined as Na=100-0×id×Nv/637×r, where the id denotes a gear ratio of a differential gear, not shown, and r is an effective radius(m) of a tire of the wheel 17 or 21. Accordingly, the number of revolutions Na of the output shaft of the transmission 13 is given as unique to each vehicle. The speed sensor 27 provides through an interface 33 to the microcomputer 5 pulses of a pulse repetition frequency two times or four times the number of revolutions Nv associated with the speed of the vehicle. For example, the revolution number pulse fed from the speed sensor 27 to the microcomputer 5 is of 120 Nv/second or 240 Nv/second. The position sensor 29 comprises a microswitch adapted to be turned on or off responsive to a gear ratio (speed change ratio) to which the transmission gear has been selected. More specifically, if five forward speed drives and a rearward drive can be selected by the transmission 13, then six microswitches are provided in the position sensor 29. Thus if and when one of the gear ratios is selected by and the transmission 13, then the corresponding microswitch is turned on. The signal of the selected microswitch of the position sensor 29 is applied to the microcomputer 5 through the interface 35.

The engine/electric hybrid vehicle also comprises an accelerating pedal 37 and a braking pedal 39. The accelerating pedal 37 is coupled to an acceleration circuit 41, which comprises a potentiometer for generating a voltage associated with a depressed or displaced amount of the accelerating pedal 37. The voltage associated with the depression of the accelerating pedal 37 is applied to the microcomputer through an interface 43. On the other hand, the braking pedal 39 is coupled to a braking circuit 45. The braking circuit 45 comprises a pneumatic circuit for providing a braking force and a pressure sensor of the pneumatic circuit for providing a voltage associated with depression of the braking pedal 39 and thus pressure of the braking pneumatic circuit. The voltage from the braking circuit is applied to the microcomputer 5 through an interface 47.

The microcomputer 5 is also connected to receive through an interface 53 a voltage which is proportional to the voltage of the battery 49. The microcomputer 5 is further connected to receive through an interface 51 a voltage which is obtained from a shunt resistor 52 interposed in a current path of the battery 49 and is proportional to the current flowing through the above described current path. A temperature sensor, not shown, is thermally coupled to the battery 49, so that a voltage which is proportional to the temperature of the battery 49 is fed from the temperature sensor through an interface 54 to the microcomputer 5. As well-known, the microcomputer 5 comprises an arithmetic logic unit 501, a read only memory 503 including a program, as to be depicted subsequently with reference to FIGS. 10, 11A to 11E, 12A, 12B 13A to 13C, 14A, and 14B for controlling the operation of the arithmetic logic unit 501, a random access memory 505 for storing data necessary for the arithmetic logic unit 501 and the like. The microcomputer 5 receives the data from various components described previously to make an operation to be described in detail subsequently, thereby to control the engine 1 and the motor/generator 3 (chopper circuit 7). The microcomputer 5 receives from a data table 55 implemented by a read only memory any data necessary for such control. The data table 55 will be described in detail subsequently.

A fuel control 57 is coupled to the engine 1. In the case where the engine is a diesel engine, the fuel control 57 comprises a butterfly valve, not shown, serving as a throttle, for adjusting an amount of air fed into an engine cylinder, for example, an injection pump, not shown, for controlling a fuel injected amount and for pressure supplying a fuel into the respective cylinders, a control apparatus for the injection pump such as a servomotor, not shown, and the like. In the case where the engine 1 is a gasoline engine, the fuel control 57 comprises a butterfly valve and a pulse motor for driving the same, for example, for controlling the opening degree of a carburetor, not shown, serving as a throttle of the engine. Although not shown, the engine 1 is further provided with an enabling apparatus and a starting apparatus of the engine. In the case where the engine 1 a diesel engine, the engine enabling apparatus comprises means for connecting a fuel line, means for enabling an injection pump and the like. On the other hand, in the case where the engine 1 is a gasoline engine, the engine enabling apparatus comprises means for connecting a fuel line, an ignition circuit and the like. The engine starting apparatus may comprise a starter motor.

The microcomputer 5 makes the above described operation and provides control data to an output port 59. The output port 59 is responsive to the thus obtained data to provide to the fuel control 57 a first control amount, i.e. a signal for controlling the opening degree of the throttle included in the above described fuel control 57. The output port 59 has a function for holding the above described control signal until new further data is received from the microcomputer 5 at the following control cycle. The microcomputer 5 also provides to an output port 61 control data for controlling to motor/generator 3. The output port 61 is responsive to the thus provided control data to provide at least one of two voltage signals, i.e. a second control amount and a third control amount. One of the voltage signals, i.e. the second control amount is a control signal used when the motor/generator 3 is run in a motoring mode, whereas the other voltage signal, i.e. the third control amount is a control signal used when the motor/generator 3 is run in a generator mode. The output port 61 also has a function for holding the previous control amount signal until new further control data is obtained from the microcomputer 5, just as in case of the above described output port 59.

Figure 4:
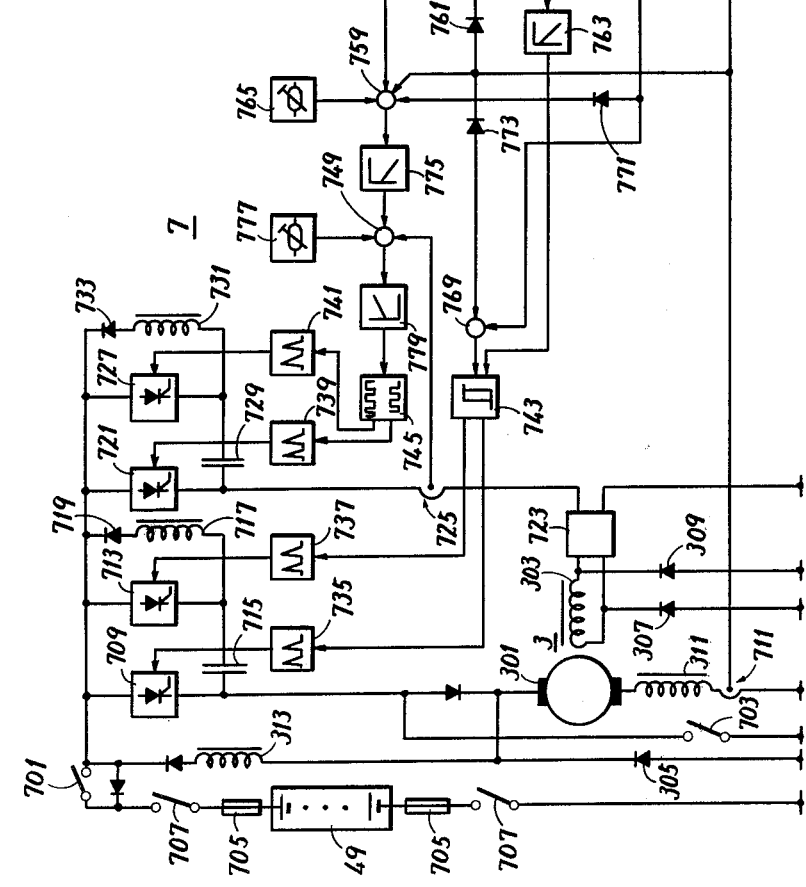
FIG. 4 is a block diagram showing a preferred embodiment of a chopper circuit included in the FIG. 3 block diagram.

FIG. 4 is a block diagram showing in detail the chopper circuit shown in FIG. 3. The chopper circuit 7 may be structured in accordance with the teaching in U.S. Pat. No. 3,735,220, entitled "CONTROL CIRCUIT FOR A D.C. MOTOR" and issued May 22, 1973 to Renner et al. Although in the above referenced U.S. Pat. No. 3,735,220 the chopper circuit is coupled to directly receive the voltages associated with the depression amounts of an accelerating pedal and a braking pedal, the FIG. 4 embodiment of the present application is coupled to receive the voltage signals obtained through the output port 61 from the microcomputer 5. Since in the FIG. 4 embodiment any means for detecting the number of revolutions of the motor/generator 3 provided in the above referenced U.S. Pat. No. 3,735,220 is not necessary, as to be described subsequently, such means has not been shown in FIG. 4.

The chopper circuit 7 is also connected from the above described battery 49 and also from the motor/generator 3. The motor/generator 3 comprises an armature 301 and a field coil 303. A drive switch 701 included in the chopper circuit 7 is turned on responsive to depression of the accelerating pedal 37, for example, while a braking switch 703 is turned on responsive to depression of the braking pedal 39. The battery 49 is connected to the chopper circuit 7 through a fuse 705, a contact 707 of a protecting relay, the above described drive switch 701 and the braking switch 703. A current flowing through the armature 301 of the motor/generator 3 is controlled by a thyristor 709 and is measured by a current transformer 711. The thyristor 709 is turned off through a cooperative operation of a thyristor 713 and a capacitor 715, a reactor 717 and a diode 719 operatively coupled to the thyristor 713. A current flowing through the field coil 303 of the motor/generator 3 is fed through a thyristor 721 and a polarity inverter 723 and the current is detected by a current transformer 725. The thyristor 721 is turned off through a cooperative operation of a thyristor 727 and a capacitor 729, a reactor 731 a diode 733 operatively coupled to the thyristor 727. The thyristors 709, 715, 721 and 727 are turned on as a function of the current pulses obtained from the corrsponding pulse generators 735, 737, 739 and 741, respectively. The armature 301 is shunted by a flywheel diode 305 and the field coil 303 is shunted with flywheel diode 307 and 309, in a well known manner.

The armature 301 is further coupled to a smoothing reactor 311 and a commutating reactor 313.

The above described pulse generators 735 and 737, and 739 and 741, each comprising a blocking oscillator, are controlled by an armature current controller 743 and a field current controller 745. The armature current detected by the direct current transformer 711 is applied to adders 747, 757, 759 and 769, while the field current detected by the direct current transformer 725 is applied to an adder 749.

On the other hand, as described previously, the chopper circuit 7 is supplied with an analog voltage for controlling a motor and an analog voltage for controlling a generator. More specifically, the above described output port 61 comprises digital/analog converters for converting the data from the microcomputer 5 into analog voltages. The outputs of the digital/analog converters 61a and 61b included in the output port 61 are applied to voltage followers 751 and 753, respectively. The voltage followers 751 and 753 serve to convert the voltages from the digital/analog converters 61a and 61b into such values as suited for the chopper circuit 7. The analog voltages obtained from the voltage followers 751 and 753 are applied to the adder 747 and a limiter 755, respectively. The output of the limiter 755 is applied to two adders 757 and 759. The adder 757 is also connected to receive the armature current associated value from the current transformer 711 through the diode 761, while the adder 759 is connected to directly receive the armature current associated value. The output voltage of the adder 757 is applied to an armature current regulator 743 through a regenerative current controller 763. On the other hand, the adder 759 is connected to receive a desired signal as preset from the braking current signal generator 765. Furthermore, the output of the adder 747 is applied to a motor current controller 767 and the output of the motor current controller 767 is applied to the adder 769 and through the diode 771 to the adder 759. The adder 769 is also connected to receive the armature current associated value from the current transformer 711 through the diode 773. The output of the adder 769 is applied to the above described armature current regulator 743. The output of the adder 759 is applied to the field regulator 775 and the output of the field regulator 775 is applied to the above described adder 749. The adder 749 is also connected to receive a signal obtained from a maximum field current limiting signal generator 777 and the output of the adder 749 is applied to the field current controller 779. The output of the field current controller 779 is applied to the previously described field current regulator 745.

Although the chopper circuit 7 is thus structured, a more specific and detailed operation thereof would be apparent by referring to the previously referenced U.S. Pat. No. 3,735,220 and hence will be omitted. Briefly, the armature current controlling thyristor 709 and the field current controlling thyristor 721 are turned on or off responsive to the voltages obtained from the digital/analog converters 61a and 61b and thus the currents Ia and If of the armature 301 and the field coil 303 of the motor/generator 3 are controlled.

The data table 55 comprises a plurality of tables in which the data is set based on the graphs shown in FIGS. 6 to 9. It goes without saying that the data proper has been set in accordance with the characteristics of the engine 1, the motor/generator 3 and the battery 49 employed in the vehicle.

Figure 6:
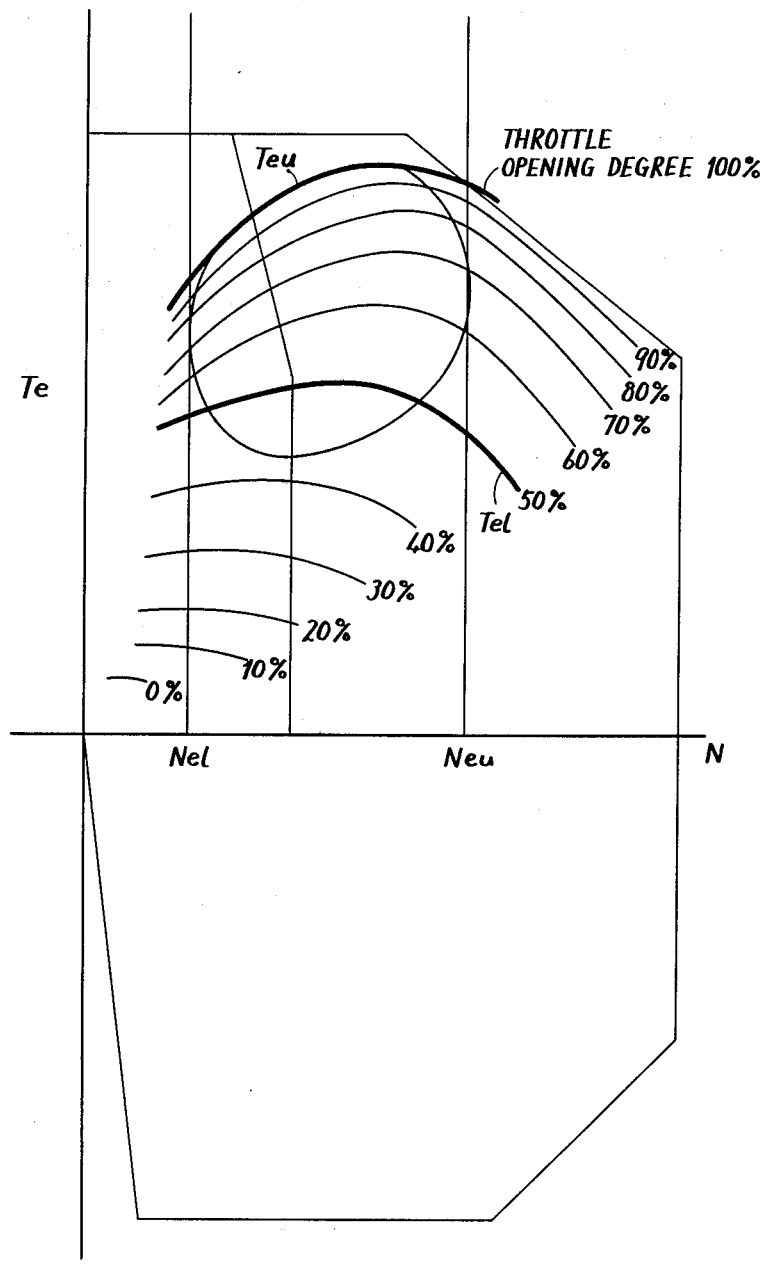
FIG. 6 is a graph showing a relation of the throttle opening degree with respect to the number of revolutions and the torque of the internal combustion engine.

FIG. 6 is a graph showing one example of a torque/revolution number characteristic of the above described engine 1. In the example shown, it has been determined that an allowable torque range of the engine 1 is defined by an upper limit value Teu of the throttle opening degree being 100% and a lower limit value Tel of the throttle opening degree being 50% controlled by the fuel control 57. Accordingly, the range of the engine torque Te allowable for a running operation of the engine is from the lower limit value Tel to the upper limit value Teu of the torque with respect to a lower limit value Nel to an upper limit value Neu of the revolution number of the engine. As described previously, although the range from the lower limit value Tel to the upper limit value Teu of the engine torque substantially covers the FIG. 1 fuel consumption being 190 gr/PS·h, a portion is lower than such fuel consumption. The reason is that, in order to simplify the control, the lower limit value of the throttle opening degree was set to 50%. The data table 55 is responsive to a request from the microcomputer 5 to provide to the microcomputer 5 data (the first control amount) concerning a required throttle opening degree (%) for attaining any engine torque Te(N) within the above described range.

Figure 7:
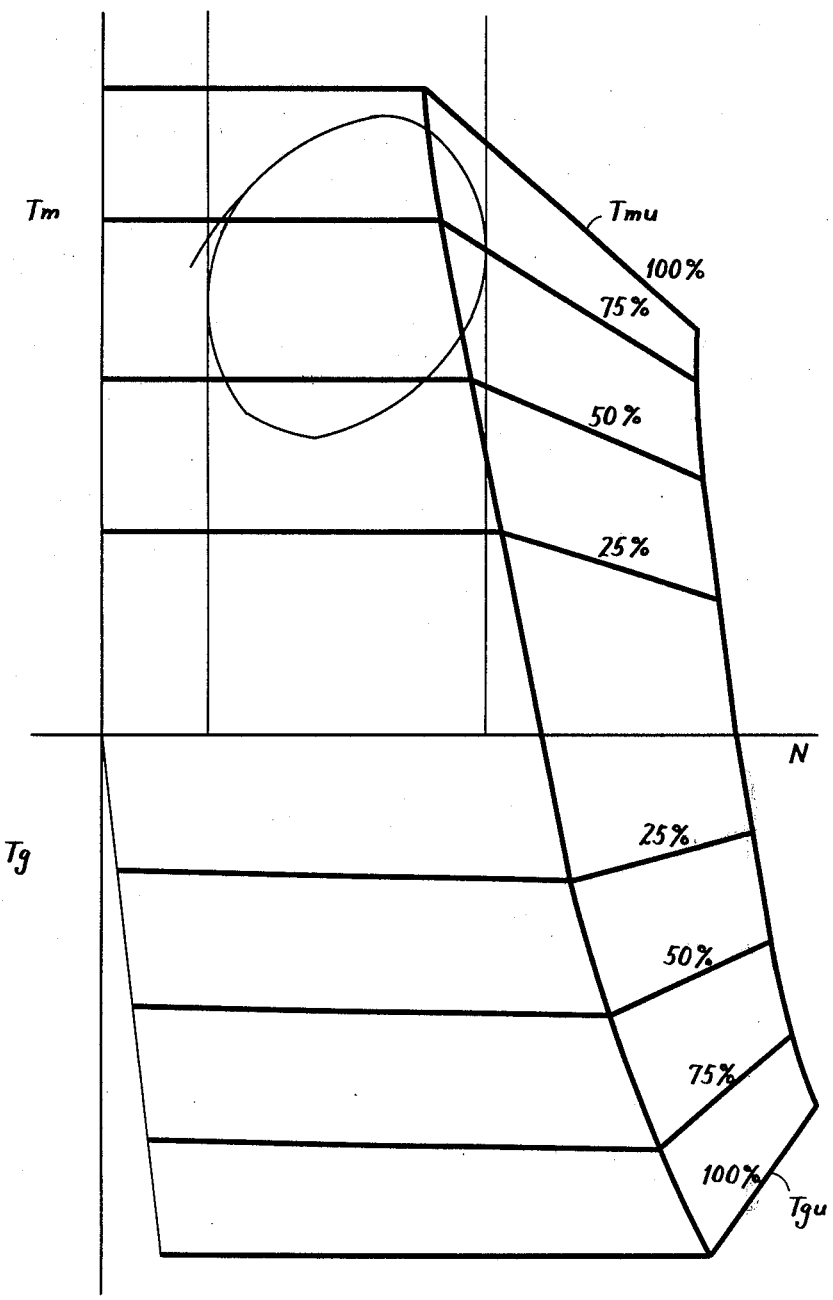
FIG. 7 is a graph showing a relation of a second control amount and a third control amount with respect to the number of shaft revolutions and the torque Tm(N), Tg(N) of a motor/generator, wherein the abscissa indicates the number of revolutions and the ordinate indicates the torque.
Figure 10:
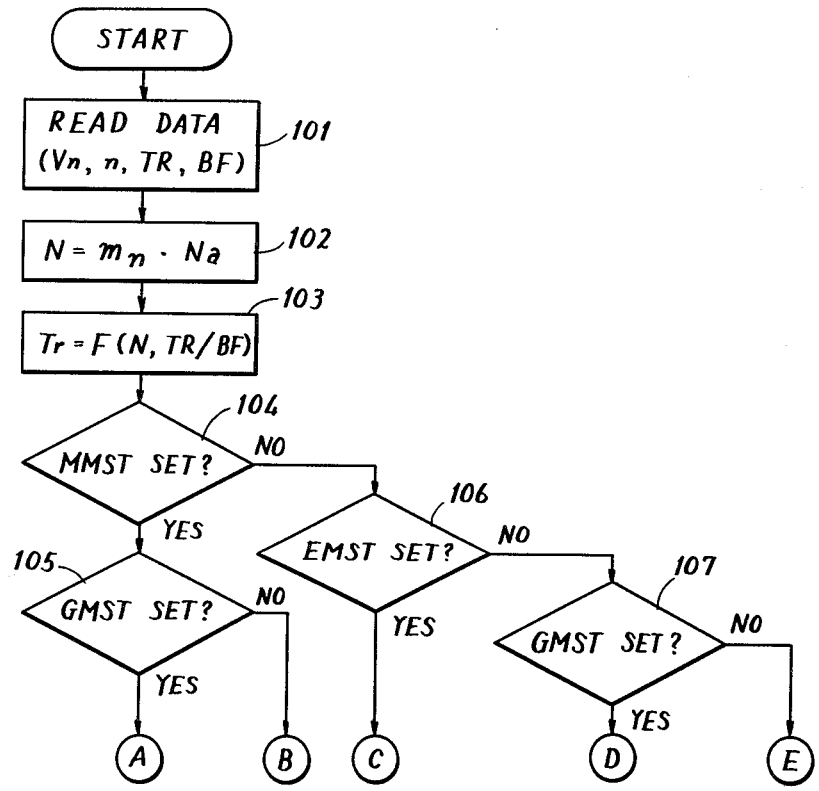

FIG. 7 is a graph showing one example of a characteristic of the motoring torque Tm(N) and the generating torque Tg(N) with respect to the revolution number of the motor/generator 3. In rendering the motor/generator 3 in the motoring mode, it has been determined that when the motor control data (the second control amount) fed from the microcomputer to the output port 61 is the maximum (100%) the motoring torque at that time is an upper limit value Tmu. On the other hand, in rendering the motor/generator 3 in a generating mode, it has been determined that, when the generator control data (the third control amount) fed from the microcomputer 5 to the output port 61 at a predetermined maximum output value of a pneumatic braking system included in the braking circuit 45 is assumed to be 100%, the generating torque at that time is an upper limit value Tgu. The data table 55 is responsive to a request from the microcomputer 5 to provide to the microcomputer 5 data for controlling the chopper circuit 7 necessary for attaining such torques Tm(N) and Tg(N).

Figure 8:
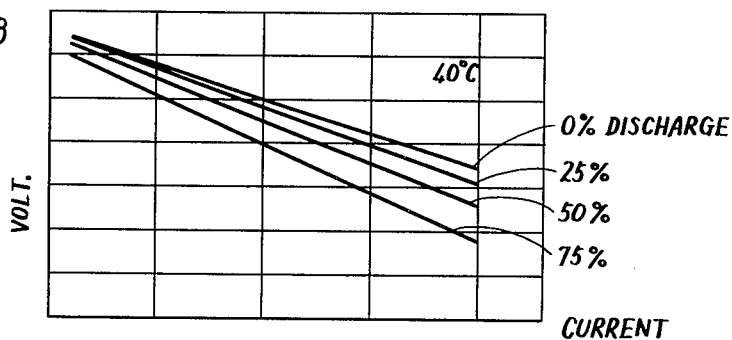
FIG. 8 is a graph showing a discharge characteristic of a battery, wherein the abscissa the current and the ordinates indicates the voltage.
Figure 9:
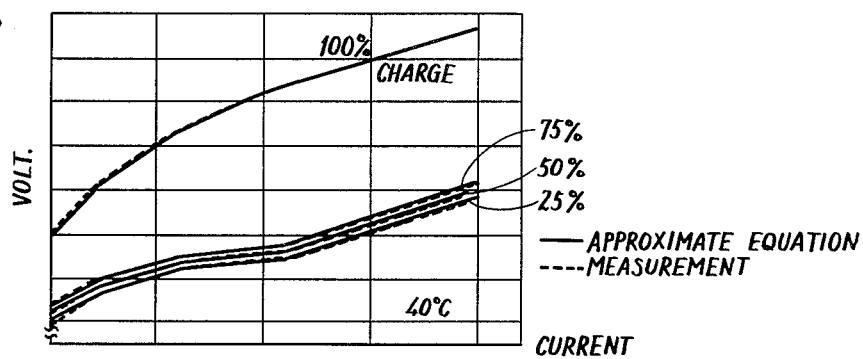
FIG. 9 is a graph showing a charge characteristic of a battery, wherein the abscissa indicates the current and the ordinate indicates the voltage.

FIGS. 8 and 9 are graphs showing characteristics of the battery 49. FIG. 8 is a graph showing a discharge characteristic of the battery wherein the abscissa indicates the current and the ordinate indicates the voltage. FIG. 9 is a graph showing a charge characteristic of the battery, wherein the abscissa indicates the current and the ordinate indicates the voltage. In the data table 55 the data concerning the 75% line in FIG. 8 and the data concerning the 100% line in FIG. 9 have been loaded. More specifically, the FIG. 8 data is fed to the microcomputer 5 as data for determining whether the battery 49 is in an overdischarged state and the FIG. 9 data is fed to the microcomputer 5 as data for determining whether the battery 49 is in an overcharged state.

Now that the preferred structural features of one embodiment of the present invention were described in the foregoing, an operation thereof will be described in the following with reference to flow diagrams shown in FIGS. 10, 11A to 11E, 12A, 12B, 13A to 13C, 14A and 14B.

In operation, first of all the microcomputer 5 receives data from the respective interfaces 33, 35, 43 and 47. More specifically, the interface 33 provides the output revolution number Nv corresponding to the speed V(km/h) of the vehicle, the interface 35 provides the shift position n (gear changed position), the interface 43 provides a voltage TR associated with a depressed amount of the accelerating pedal 37, and the interface 47 provides a voltage BF corresponding to a depressing force of the braking pedal 39. The microcomputer 52 receives the pulse (120 Nv/second or 240 Nv/second) from the interface 33, and the analog voltages TR and BF from the interfaces 43 and 47, respectively. Then the microcomputer 5 evaluates the revolution number Na of the output shaft of the transmission 13 based on the equation $Na = 1000 \times id \times Nv/637 \times r$, and further evaluates the shaft revolution number N. At that time, the interface 35 also provides the signal indicating in which position the transmission 13 is placed at that time. The microcomputer 5 further evaluates the shaft revolution number N(rpm), the gear ratio $m_n$ corresponding to the detected shift position n and the output shaft revolution number Na of the transmission 13. The shaft revolution number N can be calculated by $N = m_n \times Na$. At the following step 103 the microcomputer 5 evaluates a required torque Tr by referring to the data table 55 as a function of the voltage signal TR obtained from the interface 43 or the voltage signal BF obtained from the interface 47. The data as read and the data of the thus evaluated required torque Tr are tentatively stored in the random access memory 505.

At the following step 104 the microcomputer 5 checks a motoring mode stop flag (MMST) to determine whether the flag MMST has been set. More specifically, if and when the flag MMST has been set, this means that the motor is incapable of a running operation in the motoring mode, whereas if and when the flag MMST has been reset, this means that the motor is capable of a running operation in the motoring mode. The above described flag MMST and other flags EMST and GMST, to be described subsequently, are stored in a predetermined region of the random access memory 505. If it is determined at the step 104 that the flag MMST has been set, the microcomputer 5 proceeds to the following step 105. At the determining step 104 the microcomputer determines whether a generator mode stop flat (GMST) has been set. If it is determined that the flag GMST has been set, this means that the motor is incapable of a running operation in the generating mode, whereas if it is determined that the flag GMST has been reset, this means that the vehicle is capable of a running operation in the generating mode. Accordingly, if it is determined at the determining step 105 that the flat GMST has been set, the vehicle is incapable of the running operation either in the motoring mode or generating mode and the vehicle is capable of a running operation only in the engine mode. Accordingly, in such a case, the program proceeds to the step following Ⓐ . If and when the decision at the determining step 105 is "NO", this means that the vehicle is incapable of a running operation only in the motoring mode and therefore the microcomputer 5 proceeds to the step following Ⓑ .

If and when the decision at the above described determining step 104 is "NO", i.e. it is determined that the flag MMST has been reset, the microcomputer 5 proceeds to the determining step 106, where it is determined whether the engine mode stop flat EMST has been set. More specifically, if and when the flag EMST has been set, the engine mode is to be stopped, whereas if the flag EMST has not been set, this means that the vehicle is capable of a running operation in the engine mode. Accordingly, if and when the decision at the above described determining step 106 is "YES", this means that the vehicle is capable of a running operation in either the motoring mode or the generating mode and the microcomputer 5 proceeds to the step following Ⓒ. On the contrary, if and when the decision at the determining step 106 is "NO", the microcomputer 5 again determines at the following determining step 107 whether the flag GMST has been set. If and when the decision at the step 107 is "YES", this means that the vehicle is capable of a running operation only in the generating mode and in such a case the microcomputer 5 shifts to the step following Ⓓ. If and when the decision at the determining step 107 is "NO", this means that any of the modes, i.e. the engine mode, the motoring mode and the generating mode are capable and the microcomputer 5 then proceeds to the step following Ⓔ.

Thus, the microcomputer 5 determines in which mode the vehicle is capable of a running operation. If and when it is determined that the vehicle is capable of a running operation only in the engine mode, the program then shifts to the step following Ⓐ. If and when it is determined that the vehicle is capable of a running operation in the engine mode and the generating mode, then the program shifts to the step following the Ⓓ. If and when it is determined that the vehicle is capable of a running operation in the motoring mode or the generating mode, then the program shifts to the step following Ⓒ. Furthermore, if and when it is determined that the vehicle is capable of a running operation both in the engine mode and the motoring mode, the program shifts to the step following Ⓓ. If and when it is determined that the engine mode, the motoring mode and the generating mode are capable, the program shifts to the step following Ⓔ. Now in the following, the steps following Ⓐ, Ⓑ, Ⓒ, Ⓓ and Ⓔ will be described.

Figure 13A:
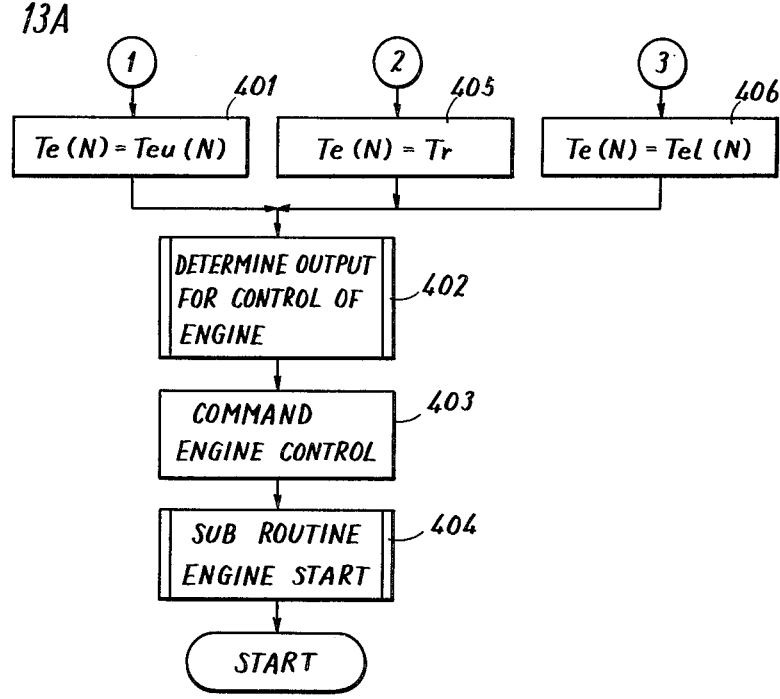

If and when the decision at the determining step 105 is "YES", the microcomputer 5 proceeds to the following step 108. At the step 108, it is determined whether the required torque Tr obtained previously at the step 103 exceeds the upper limit value Teu(N) of the engine torque. The fact that the required torque Tr exceeds the upper limit value Teu(N) of the engine torque means that, referring to FIG. 6, for example, even if the throttle opening degree is set to 100% the required torque Tr cannot be attained only by the engine 1. However, in the case of Ⓐ, since the vehicle is capable of a running operation only in the engine mode, only one possible approach is to run the engine 1 with the maximum torque Teu(N) in a full throttle state, even if the decision at the determining step 108 is "YES". Accordingly, in this case the microcomputer 5 shifts to the step following 1 (FIG. 13A). At the step 401 the microcomputer 5 sets the engine torque Te(N) as the upper limit value Teu(N). At the step 402 the microcomputer 5 refers to the FIG. 6 data set in the data table 55 so as to run the engine using the engine torque Te(N) as the upper limit value Teu(N), thereby to determine the throttle opening degree or the data (or a voltage) associated with the throttle opening degree for running the engine with the above described upper limit value Teu(N) of the torque. Thus, the output for controlling the engine is determined. Then at step 403, the microcomputer 5 provides to the output port 59 a command for attaining the throttle opening degree being 100% in order to control the engine with the thus determined throttle opening degree (in this case 100%). At the step 404 the program shifts to the subroutine of the engine start.

Figure 12A:
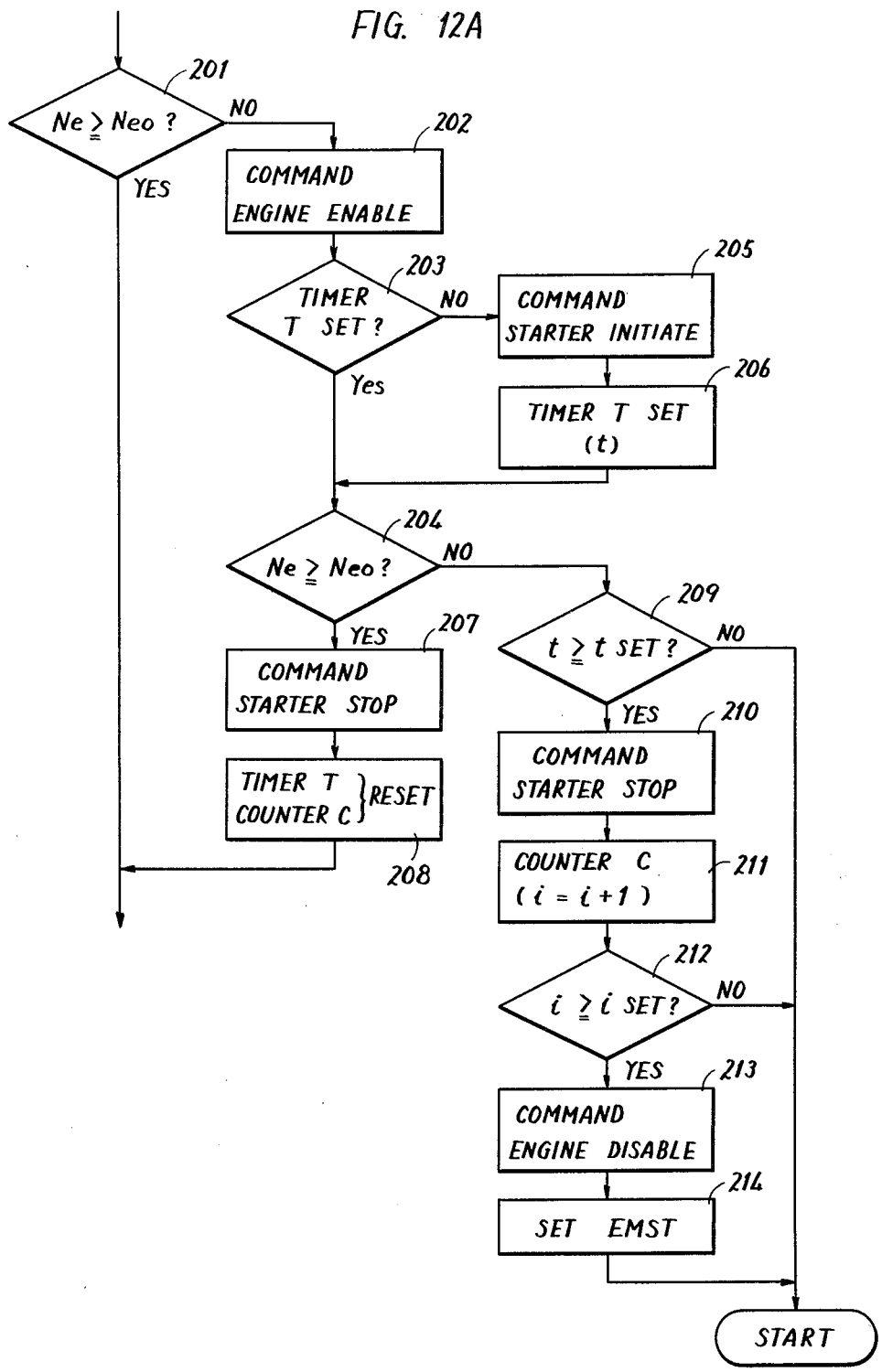

The subroutine of the engine start is shown in FIG. 12A. Referring to the subroutine of the engine start shown in FIG. 12A, first of all the microcomputer 5 determines at the determining step 201 whether the revolution number Ne of the engine 1 exceeds the revolution number Neo in an idling state. The decision as to whether Ne exceeds Neo is made by referring to a signal indicating the engine revolution number fed from the interface 25. More specifically, the interface 25 provides to the microcomputer 5, a voltage signal which is the higher when the revolution number Ne exceeds the revolution number Neo of the idling state. Accordingly, if and when the voltage obtained from the interface 25 is the higher the decision at the determining step 201 is "YES" and the program then returns to a predetermined step in the main routine. However, in the case where Ne is smaller than Neo, since the engine 1 is in a stop state, the voltage obtained from the interface 25 is nil and the microcomputer 5 provides at the following step 202 a command for enabling the engine. The command for enabling the engine is applied to the enabling apparatus, not shown, provided in the engine 1, as described previously, so that the fuel line is connected and the injection pump is enabled. At the same time the microcomputer 5 determines at the step 203 whether the timer T has been set. The timer T is implemented using a predetermined region of the random access memory 505, for example. If and when the decision at the determining step 203 is "YES", the program shifts to the following determining step 204. If the decision at the determining step 204 is "NO", the microcomputer 5 provides at the step 205 a starting command to the starting apparatus, not shown, of the engine. More specifically, at the step 205 a command for energizing the starter motor is applied. At the following step 206 a time period of t second is set in the timer T and the program then proceeds to the determining step 204. The time period t being set in the timer T is selected to be 5 to 10 second, for example. At the determining step 204, the microcomputer 5 is responsive to the voltage signal obtained from the interface 25 to determine again whether the engine revolution number Ne exceeds the revolution number Neo of the idling state. If the decision at the step 204 is "YES", this means that the engine 1 is placed in a running operation state and the microcomputer 5 commands a stop to the starting apparatus, not shown, and resets the timer T and a counter C, to be described subsequently, at the steps 207 and 208.

If and when the decision at the determing step 204 is "NO", this means that the engine 1 is not in a running operation state and the microcomputer 5 proceeds to the following step 209. At the determining step 209, it is determined whether the time t has passed a timer period tset set in the timer T. If and when the time period t has passed for a time period tset, i.e. the decision at the step 209 is "YES", the microcomputer 5 also provides at the step 210 a stop command to the starting apparatus, just as in case of the previous step 207. At the same time, the microcomputer 5 counts up the count value i in the counter C at the step 211. The counter C is also formed in a predetermined region of the random access memory 505, as in case of the timer T, so that the number of failures in establishing a running operation of the engine in spite of the start command being fed to the starting apparatus of the engine 1 is detected. The microcomputer 5 determines at the step 212 whether the count value i of the counter stepped up at the step 211 has reached a predetermined number iset, say 5 or 6 times. If and when the decision at the determining step 212 is "YES", this means that the engine is in an incapable state for some reason, such as shortage of fuel, out of order, and the like. Accordingly, the microcomputer 5 provides at the following step 213 an engine incapability command. More specifically, a command is provided to the enabling apparatus, not shown, of the engine 1, so that the fuel line is disconnected, the injection pump is disabled, and the like. At the same time, the engine mode stop flag EMST is set at the step 214. Thereafter the program returns to "START", as in the case where the decision at the previous determining step 209 is "NO" and in the case where the decision at the determining step 212 is "No".

When it is confirmed at the subroutine of the engine start that the engine 1 is placed in a running operation state or is in a running operation state, the engine 1 is run with the upper limit value Teu(N) of the torque as set at the previous step 401. More specifically, even if the required torque Tr exceeds Teu(N) in the case of Ⓐ, the engine 1 is controlled to be run with the upper limit value Teu(N) of the torque.

If and when the decision at the determining step 108 is "NO" in the case of Ⓐ, the microcomputer 5 further determines at the determining step 109 whether the required torque Tr is plus, i.e. whether the same is in the range from zero to Teu(N). If and when it is determined that the required torque Tr is plus, the microcomputer 5 proceeds to the step following ②. More specifically, in the case of Ⓐ, i.e. in the case where only the engine mode is capable and the required torque Tr is smaller than the upper limit Teu(N) of the engine torque and is plus, the microcomputer 5 proceeds to the step 405 following ②. At the step 405 the engine torque Te(N) is set as a required torque Tr. At the same time, referring to the data table 55, the data corresponding to the throttle opening degree necessary for using the engine torque Te(N) as the required torque Tr is determined at the step 402. More specifically, the engine controlling output is determined. Then at the following step 403, a voltage corresponding to the throttle opening degree thus determined, i.e. the first control amount data is fed to the outpout port 59. Thereafter at the step 404 the program shifts to the subroutine of the engine start shown in FIG. 12A. Accordingly, in this case, the engine 1 is controlled with the torque Te(N) as the required torque Tr.

Figure 12B:
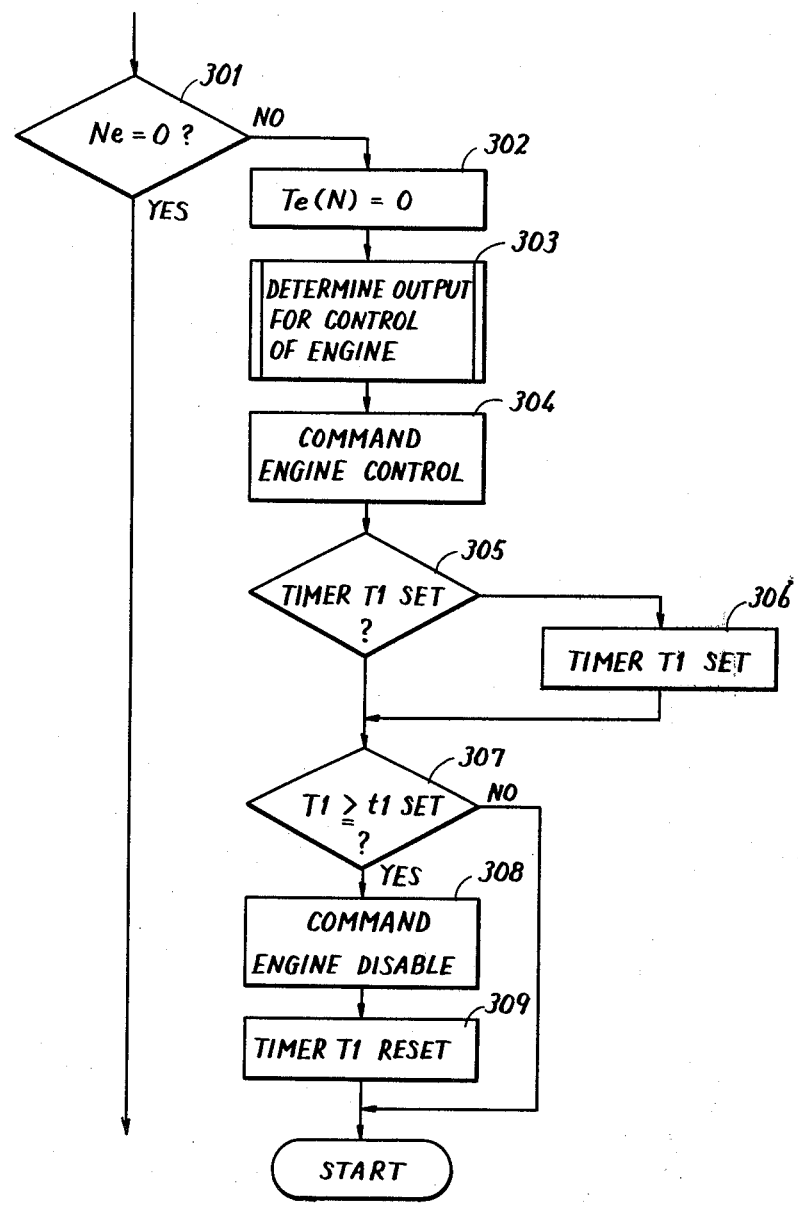

If and when the decision at the above described determining step 109 is "NO", i.e. if and when only the engine mode is capable and the required torque Tr is minus, this means that such control is incapable only with the engine 1 and the microcomputer 5 shifts to the subroutine of the engine stop at the step 110. The subroutine of the engine stop is shown in FIG. 12B.

At the subroutine of the engine stop, the microcomputer 5 first determines at the step 301 whether the engine revolution number Ne is zero. The decision can be made based on the signal obtained from the interface 25 to the microcomputer 5. If and when the decision at the determining step 301 is "YES", this means that the engine 1 is in a stop state. On the contrary, if and when the decision at the determining step 301 is "NO", this means that the engine 1 is not in a stop state and the microcomputer 5 sets at the following step 302 the engine torque Te(N) to zero. At the following step 303 the microcomputer 5 refers to the data table 55 to determine the throttle opening degree necessary for setting the engine torque Te(N) to zero. At the step 303 the microcomputer 5 obtains from the data table 55 the data for minimizing the opening degree of the throttle included in the fuel control 57. At the following step 304 the data for minimizing the opening degree of the throttle, i.e. the first control amount data is fed to the output port 59. The microcomputer 5 thus provides a control command for minimizing the opening degree of the throttle to the fuel control 57 and then determines at the following determining step 305 whether the timer T1 has been set. The timer T1 is formed in a predetermined region of the random access memory 505 and is used to determine the lapse of a time period after the stop command for minimizing the opening degree of the throttle is fed. Unless the timer T1 has been set, a predetermined time period t1set, say three minutes, is set in the timer T1 at the step 306, whereupon the program shifts to the determining step 307. At the step 307 it is determined whether the time period t1set set in the timer T1 has lapsed. If and when the decision at the determining step 307 is "YES", the microcomputer 5 provides at the step 308 a disabling command to the enabling apparatus, not shown, provided in the engine 1, just as in case of the subroutine 213 of the engine start shown in FIG. 12A. At the same time, the timer T1 is reset at the step 309. After the timer T1 is reset, the program returns to "START" just as in the case where the decision at the previous determining step 307 was "NO". Meanwhile, if and when the decision at the determining step 301 is "YES", then the program returns to the main routine. Accordingly, the engine 1 is placed in a stop state after the engine 1 is placed in an idling state and the time tlset lapses when the required torque Tr is minus in the case of Ⓐ shown in FIG. 11A.

Now the case of Ⓑ, i.e. the case where the engine mode and the generating mode are capable will be described. In the case of Ⓑ, it is first determined at the step 111 shown in FIG. 11B whether the required torque Tr evaluated at the previous step 103 exceeds the upper limit value Teu(N) of the engine torque. If and when the decision at the step 111 is "YES", the program shifts to the step following ①, i.e. the step 401 in FIG. 13A. More specifically, in such a case, both the engine mode and the generating mode are capable; however, since the required torque Tr exceeds the upper limit value Teu(N) of the engine torque, the engine is run with the upper limit value Teu(N) of the engine torque.

If and when the decision at the determining step 111 is "NO", then it is determined at the following determining step 112 whether the required torque Tr exceeds the lower limit value Tel(N) of the engine torque. If and when the decision at the determining step 112 is "YES", this means that the required torque Tr is within the range of the engine torque allowable for a running operation and the microcomputer 5 shifts to the following step 405 shown in FIG. 13A. More specifically, in this case the engine 1 is run using the engine torque Te(N) as the required torque Tr.

If and when the decision at the determining step 112 is "NO", the microcomputer 5 determines at the following determining step 113 whether the required torque Tr is plus. If and when the decision at the determining step 113 is "YES", this means that the required torque Tr is within the range from zero to the lower limit value Tel(N) of the engine torque. In such a case, if the engine is run with the torque smaller than the lower limit value Tel(N) of the torque, then it follows that the torque deviates from the range of a better fuel consumption. Therefore, the engine 1 is run with the lower limit value Tel(N) of the allowable torque range, while the redundant torque is absorbed by running the motor/generator 3 as a generator. More specifically, if and when the decision at the step 113 is "YES", the microcomputer 5 sets at the following step 114 the engine torque Te(N) to the lower limit value Tel(N) and the generating torque Tg(N) to "Tel(N)−Tr". At the following step 115, the microcomputer 5 determines the data corresponding to the throttle opening degree for setting the engine 1 to the lower limit value Tel(N) of the torque, i.e. the first control amount, by referring to the data table 55. Then at the step 116 the data for setting the throttle opening degree (in this case 50%), i.e. the first control amount is fed to the output port 59. Then the microcomputer 5 refers to the data table 55 to determine at the step 117 the data for the output port 61, i.e. the third control amount so that the generating torque Tg(N) when the motor/generator 3 is run as a generator may be the difference "Tel(N)−Tr" between the lower limit value Tel(N) of the engine torque and the required torque Tr. Then the data corresponding to the third control amount thus determined is fed to the output port 61. The motor/generator 3 is capable of a running operation only either the motor mode or the generating mode. Accordingly, if and when the microcomputer 5 provides a control command for the generator, the control command for the motor is precluded, whereas if and when the microcomputer 5 provides the control command for the motor the control command for the generator is precluded. If and when the control command for the generator is thus fed to the output port 61, an output voltage from the digital/analog converter 61b (FIG. 4) is provided to the chopper circuit 7. Accordingly, the chopper circuit 7 shown in FIG. 4 controls a regenerative current from the generator to the battery 49 in accordance with the voltage thus provided, so that the generating torque Tg(N) is controlled to become the above described value. At the same time, the microcomputer 5 proceeds at the step 119 to the subroutine of the engine start (FIG. 12A). Accordingly, if the case of Ⓑ and in the case where the required torque Tr is within the range from zero to the lower limit value Tel(N) of the torque, the engine 1 is run with the lower limit value Tel(N) of the torque, while the motor/generator 3 is run as a generator with the generating torque Tg(N) being set to the difference "Tel(N)−Tr".

In the case of Ⓑ and in the case where the decision at the determining step 113 is "NO", this means that the required torque Tr is minus and the program shifts to the step following ④. More specifically, in this case the microcomputer 5 shifts to the step 501 shown in FIG. 13B. At the step 501 it is determined whether the required torque Tr is within the range from zero to the upper limit value Tgu(N) of the generating torque. If and when the decision at the determining step 501 is "YES", the microcomputer then sets at the following step 502 the generating torque Tg(N) as the required torque Tr. Then at the following step 503, the microcomputer determines the data corresponding to the third control amount for setting the generating torque Tg(N) to the required torque Tr by referring to the data table 55 just as in case of the step 117 shown in FIG. 11B. At the following step 503 the control data is provided to the output port 61. If and when the decision at the above described determining step 501 is "NO", since a larger breaking torque cannot be obtained in spite of the fact that the required torque Tr is larger than the upper limit value Tgu(N) of the generating torque, at the step 505 the generating torque Tg(N) is set as the upper limit value Tgu(N). Then at the steps 503 and 504 the microcomputer determines the data of the third control amount by referring to the data table 55 so as to set the generating torque Tg(N) to the upper limit value Tgu(N) and provides the data to the output port 61. Thus the generating torque Tg(N) in the case where the required torque Tr is minus is controlled. After the step 504 the microcomputer 5 shifts to the step (FIG. 14B) following ⑪ in order to determine whether the battery 49 can be charged.

Figure 11A:
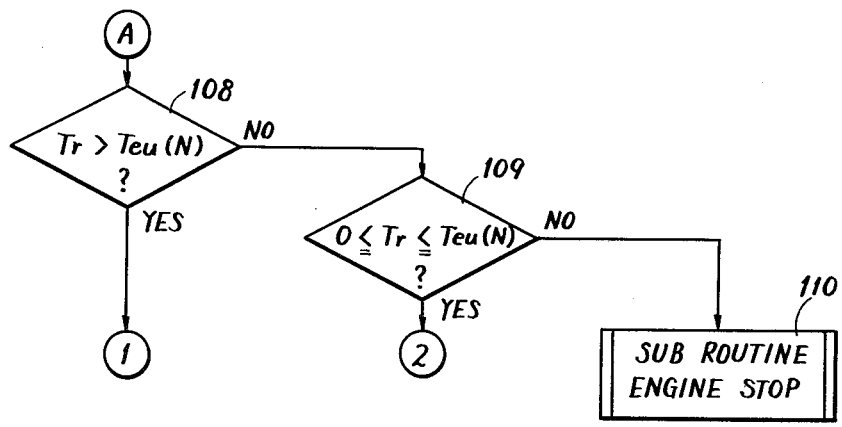
Figure 11B:
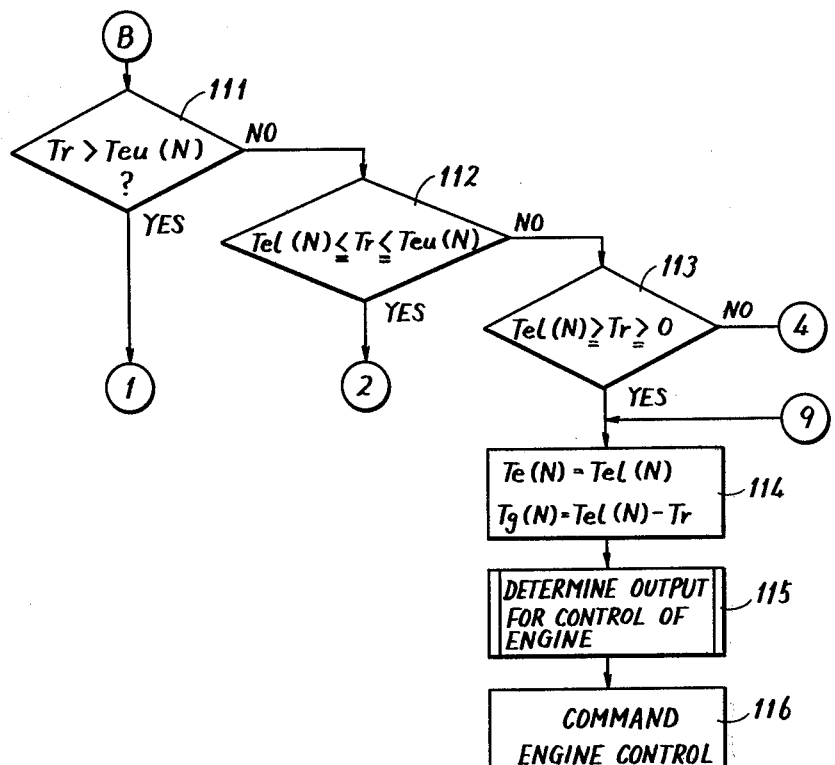
Figure 11C:
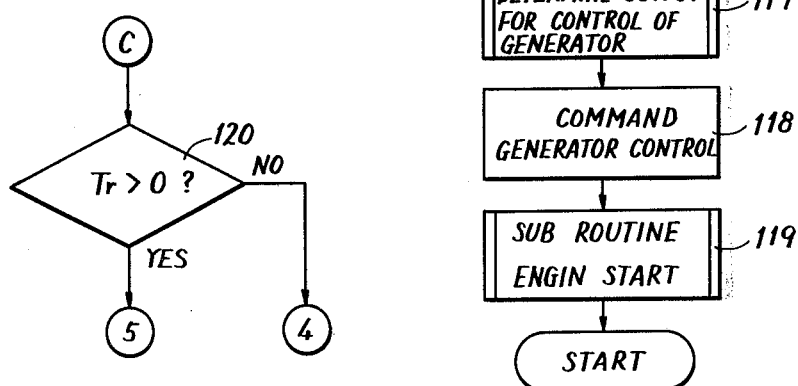

In the case of Ⓒ, i.e. in the case where either the motoring mode or the generating mode is capable, the microcomputer 5 proceeds to the determining step 120 shown in FIG. 11C. More specifically, it is determined at the determining step 120 whether the required torque Tr exceeds zero, i.e. the required torque is plus. if and when the required torque Tr is plus, the microcomputer 5 proceeds to the step following ⑤. On the contrary, in the case where the required torque Tr is minus, the microcomputer 5 shifts to the step 501 following ④.

In the case where the required torque Tr is plus, the microcomputer 5 shifts to the step 601 following ⑤ shown in FIG. 13C. At the step 601 the microcomputer 5 determine whether the required torque Tr is smaller than the upper limit value Tmu(N) of the motoring torque. When the decision at the determining step 601 is "YES", i.e. the required torque Tr is smaller than the upper limit value Tmu(N) of the motoring torque, at the step 602 the microcomputer 5 sets the motoring torque Tm(N) to the required torque Tr. Then at the following step 603, the microcomputer 5 refers to the data table 55 to determine the data of the second control amount necessary for setting the motoring torque Tm(N) to the required torque Tr. The second control amount data thus determined is fed to the output port 61, whereby control of the motor is commanded at the step 604. Meanwhile, from the output port 61 a voltage signal for controlling the chopper circuit 7 obtainable from the digital/analog converter 61a is obtained in accordance with the data of the second control amount. In such a case, even if an output voltage corresponding to the third control amount obtainable from the digital/analog converter 61b previously had been available, the same would have been precluded when the output voltage of the second control amount is obtained.

If and when it is determined at the determining step 601 that the required torque Tr exceeds the upper limit value Tmu(N) of the motoring torque, the microcomputer 5 sets at the following step 605 the motoring torque Tm(N) to the upper limit value Tmu(N), whereupon the same proceeds to the steps 603 and 604. In such a case, it goes without saying that the voltage fed from the output port 61 to the chopper circuit 7 is the maximum value (100%) of a predetermined voltage range for setting the motoring torque Tm(N) to the upper limit value Tmu(N). After the above described step 604, the microcomputer 5 proceeds to the step following ⑩ shown in FIG. 14A in order to determine whether the battery 49 has been in an overdischarged state.

Figure 11D:
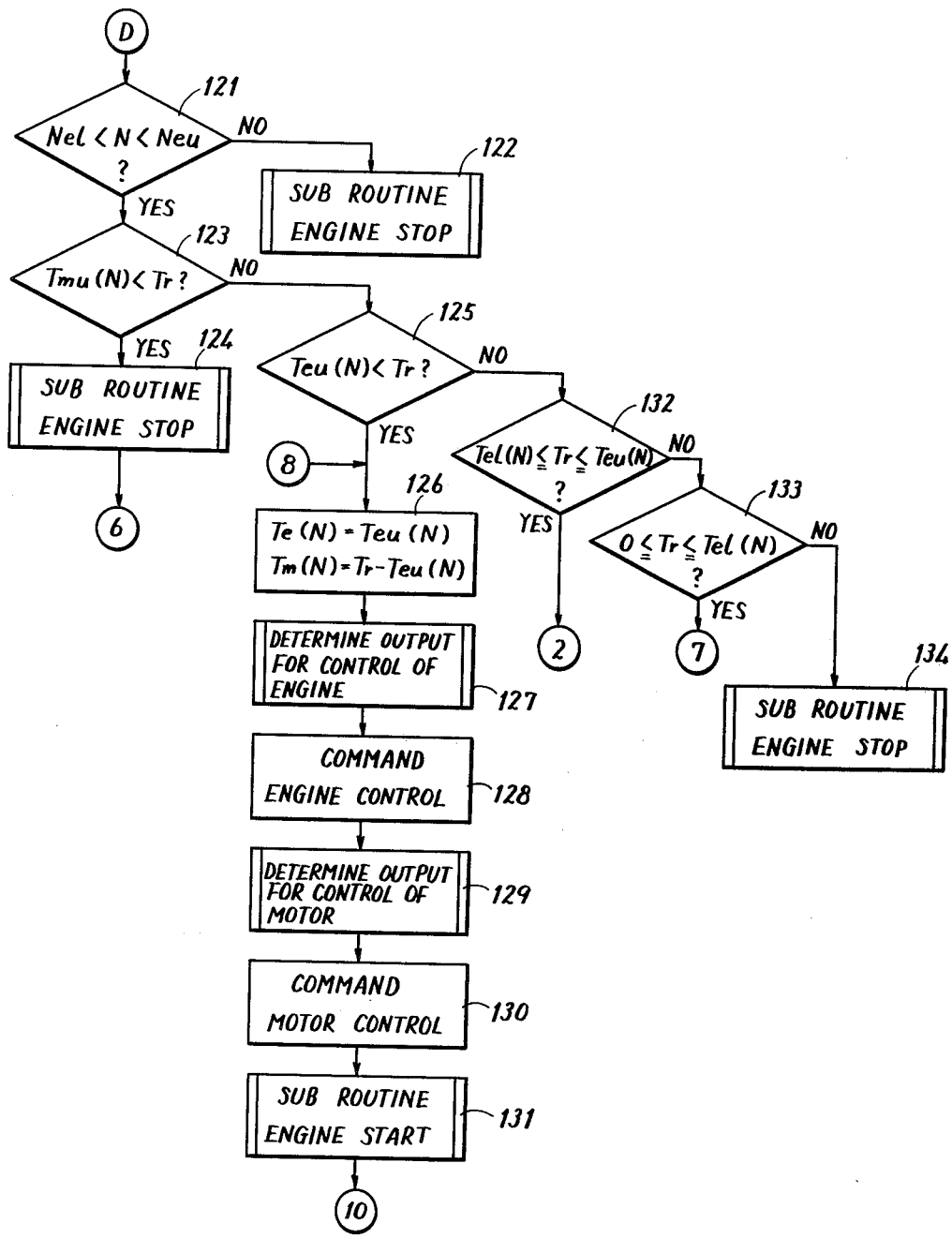

If and when the decision at the above described determining step 107 is "YES", both the engine mode and the motoring mode are capable and in such a case the microcomputer 5 proceeds to the step shown in FIG. 11D following Ⓓ. In the case of Ⓓ, the microcomputer 5 first determines at the determining step 121 whether the shaft revolution number N obtained at the previous step 102 is within the range of the allowable revolution number Nel to Neu of the engine 1. If and when the decision at the determining step 121 is "NO", this means that the engine 1 is incapable of a running operation and at the following step 122 the program shifts to the subroutine for stopping the engine as shown in FIG. 12B.

On the contrary, the decision at the determining step 121 is "YES", the microcomputer 5 determines at the following determining step 123 whether the required torque Tr exceeds the upper limit value Tmu(N) of the motoring torque. When the decision at the determining step 123 is "YES", the microcomputer 5 proceeds at the following step 124 to the subroutine of the engine stop (FIG. 12B) and shifts to the step following ⑥. If and when it is determined at the determining step 123 that the required torque Tr is smaller than the upper limit value Tmu(N) of the motoring torque, then at the step 125 the microcomputer 5 determines whether the required torque Tr exceeds the upper limit value Teu(N) of the engine torque. If and when the decision at the determining step 125 is "YES" i.e. if and when the required torque Tr is within the range from the upper limit value Teu(N) of the engine torque to the upper limit value Tmu(N) of the motoring torque, then at the step 126 the microcomputer 5 sets the engine torque Te(N) to the upper limit value Teu(N) and sets the motoring torque Tm(N) to the difference "Tr−Teu(N)". Then the microcomputer 5 refers to the data table 55 to determine at the step 127 the data corresponding to the throttle opening degree for setting the engine torque Te(N) to the upper limit value Teu(N). At the same time, the first control amount data is provided to the output port 59 for controlling the throttle to the throttle opening degree thus evaluated. More specifically, the command for controlling the throttle opening degree of the engine 1 is fed at the step 128. Then at the step 129 the microcomputer 5 refers to the data table 55, thereby to determine the second control amount data necessary for determining the motoring torque Tm(N) to the above described value "Tr−Teu(N)". On the other hand, at the step 130, the second control amount data thus determined is provided to the output port 61, so that the motor control is commanded. Accordingly, a control voltage is supplied from the output port 61 to the chopper circuit 7. Therefore, the chopper circuit 7 controls a power supply from the battery 49 to the motor/generator 3, so that the motoring torque Tm(N) is controlled to the above described value. Then in order to render the engine 1 in a running operation state, the program shifts at the step 131 to the subroutine of the engine start (FIG. 12A). After the above described subroutine, the microcomputer 5 shifts to the step following ⑩ in order to determine whether the battery 49 is in an overdischarged state.

If and when the decision at the above described determining step 125 is "NO", i.e. in the case where it is determined that the required torque Tr is smaller than the upper limit value Teu(N) of the engine torque at the following determining step 132, the microcomputer 5 determines whether the required torque Tr exceeds the lower limit value Tel(N) of the engine torque. If and when the decision at the determining step 132 is "YES", i.e. in the case where it is determined that the required torque Tr is within the allowable engine torque range, then the program shifts to the step 405 following ② described previously in conjunction with FIG. 13A. If and when the decision at the determining step 132 is "NO", i.e. if and when it is determined that the required torque Tr is smaller than the lower limit value Tel(N) of the engine torque, then at the determining step 133, the microcomputer 5 determines whether the required torque Tr is plus, i.e. whether the required torque Tr is within the range from zero to the lower limit value Tel(N). If and when the decision at the step 133 is "YES", then the microcomputer 5 proceeds to the step 602 following ⑦ shown in FIG. 13C. More specifically, if and when the required torque Tr is within the range from the lower limit value Tel(N) of the engine torque to zero, and if and when the generating mode is capable, then as described previously the engine 1 is run with the lower limit value Tel(N) of the torque, while the redundant torque is absorbed by running the motor/generator in the generating mode; however, since in this case the generating mode stop flag GMST has been set, the required torque Tr is attained by the motoring torque Tm(N). If and when the decision at the determining step 133 is "NO", i.e. in the case where it is determined that the required torque Tr is minus, since the flag GMST has been set, the microcomputer 5 shifts to the subroutine of the engine stop shown in FIG. 11B.

Figure 11E:
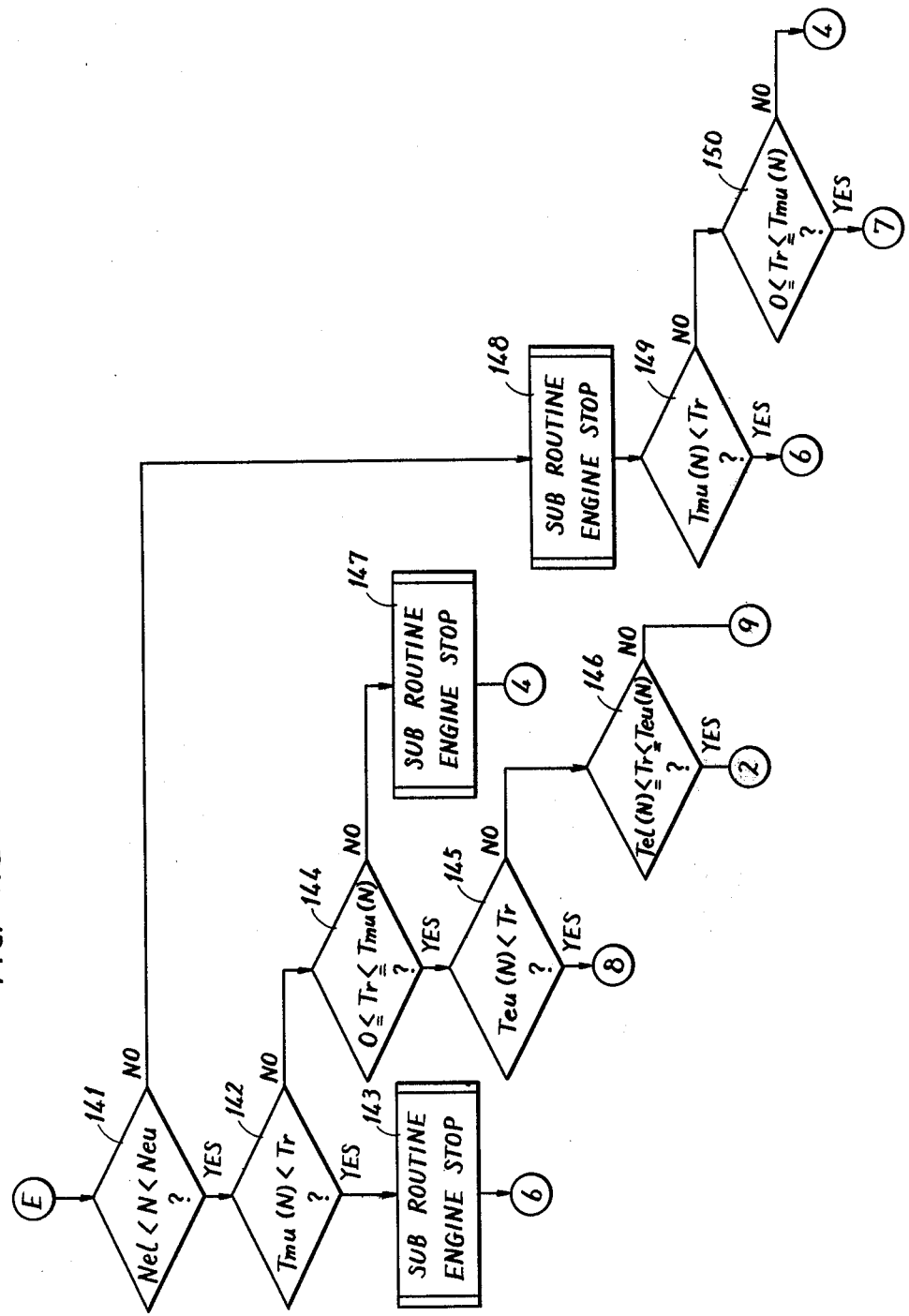

The case of Ⓔ is shown in FIG. 11E. In this case, the engine mode and the motoring mode or the generating mode are capable. At the step 141 following Ⓔ, the microcomputer 5 first determines whether the shaft revolution number N evaluated at the previous step 102 (FIG. 10) is within the allowable engine revolution number range, i.e. the range from Nel to Neu. If and when the decision at the determining step 141 is "YES", then at the following step 142 the microcomputer 5 determines whether the required torque Tr evaluated at the previous step 103 (FIG. 10) exceeds the upper limit value Tmu(N) of the motoring torque. If and when the decision at the determining step 142 is "YES", this means that the engine mode is unnecessary and at the following step 143 the microcomputer 5 proceeds through the subroutine of the engine stop shown in FIG. 11B and then proceeds to the step 605 following ⑥ shown in FIG. 13C. More specifically, in the case Ⓔ, when the required torque Tr exceeds the upper limit value Tmu(N) of the motoring torque, the motor/generator 3 is controlled to the motoring mode and is run with the torque Tm(N) being set to the upper limit value Tmu(N).

The decision at the above described determining step 142 is "NO", then at the following determining step 144 the microcomputer 5 determines whether the required torque Tr is plus. If and when the decision at the determining step 144 is "YES", then at the following step 145 the microcomputer 5 determines whether the required torque Tr exceeds the upper limit value Teu(N) of the engine torque. If and when the decision at the determining step 145 is "YES", then the microcomputer proceeds to the step 126 following ⑧ shown in FIG. 11B. More specifically, in this case, the engine 1 is run with the upper limit value Teu(N) of the torque and the deficient torque is supplemented with the motoring torque. To that end, the motoring torque Tm(N) is set to "Tr−Teu(N)".

If and when the decision at the above described determining step 145 is "NO", then at the following determining step 146 the microcomputer 5 determines whether the required torque Tr is within the running allowable engine torque range, i.e. whether the required torque Tr is within the range from the lower limit value Tel(N) to the upper limit value Teu(N) of the engine torque. When the decision at the determining step 146 is "YES", this means that the required torque Tr can be obtained only with the engine torque Te(N) and the microcomputer 5 proceeds to the step 405 following ② shown in FIG. 13A. On the contrary, if and when the decision at the determining step 146 is "NO", this means that the required torque Tr is smaller than the lower limit value Tel(N) of the engine torque and the microcomputer 5 proceeds to the step 114 following ⑨ shown in FIG. 11B. More specifically, in this case the engine 1 is run with the lower limit value Tel(N) of the engine torque and the redundant torque is absorbed by running the motor/generator 3 in the generating mode. Accordingly, in this case the generating torque Tg(N) is set to the difference "Tel(N) – Tr".

Figure 13B:
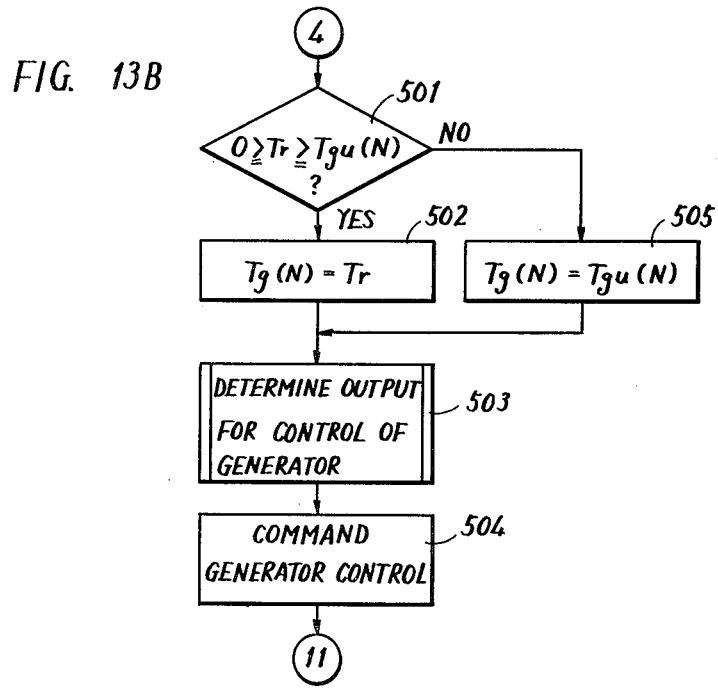
Figure 14A:
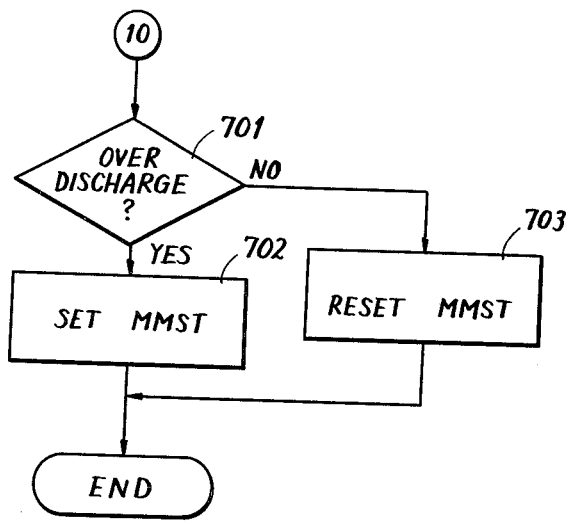
Figure 14B:
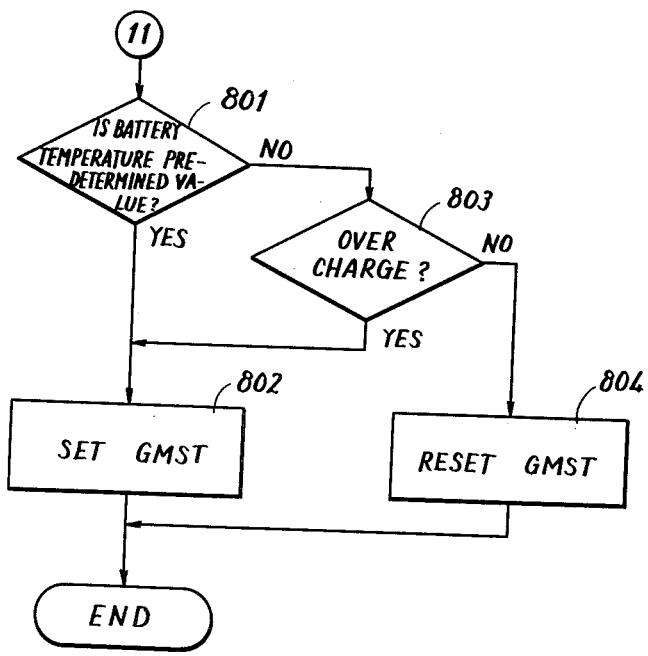

If and when it is determined at the above described determining step 144 that the required torque Tr is not plus, then at the following step 147 the microcomputer 5 proceeds through the subroutine of the engine stop shown in FIG. 12B and then proceeds to the step 501 following ④ shown in FIG. 13B. More specifically, in this case the engine 1 is brought to an idling state or a stop state and the minus required torque Tr is obtained with the generating torque Tg(N).

If and when the decision at the above described determining step 141 is "NO", i.e. if and when the shaft revolution number N is not within the allowable engine revolution number range from Nel to Neu, then at the following step 148 the microcomputer 5 proceeds through the subroutine of the engine stop (FIG. 12B) and at the step 149 determines whether the required torque Tr exceeds the upper limit value Tmu(N) of the motoring torque. If and when the decision at the determining step 149 is "YES", the microcomputer 5 proceeds to the step 605 following the ⑥ shown in FIG. 13C. More specifically, in this case the motor/generator 3 is run in the motoring mode and the motoring torque Tm(N) is set to the upper limit value Tmu(N). If and when the decision at the above described determining step 149 is "NO", then at the following determining step 150 the microcomputer 5 determines whether the required torque Tr is plus. If and when it is determined at the determining step 150 that the required torque Tr is plus, i.e. the required torque Tr is within the range from zero to Tmu(N), the microcomputer 5 proceeds to the step 602 following ⑦ shown in FIG. 13C. More specifically, in this case the shaft revolution number N is off the engine allowable range and the required torque Tr is smaller than the lower limit value Tmu(N) of the motoring torque and plus and therefore the required torque Tr is attained with the motoring torque Tm(N). On the other hand, if and when it is determined at the determining step 150 that the required torque Tr is minus, the microcomputer 5 proceeds to the step 501 following ④ in FIG. 13B in order to attain the generating torque Tg(N). More specifically, in this case the motor/generator 3 is run in the generating mode, whereby the minus required torque Tr is absorbed.

The step following ⑩ is a routine for determining a discharge state of the battery 49. At the step 701 the microcomputer 5 receives a voltage corresponding to the discharge current of the battery 49 and a voltage corresponding to the voltage of the battery 49 through the interfaces 51 and 53, respectively. Then the data corresponding to the 75% line in the FIG. 8 graph is obtained by referring to the data table 55. At that time it is determined whether the voltage corresponding to the current of the battery 49 is lower than the voltage value data corresponding to the discharge current of the battery in the case of 75% discharge previously obtained and thus whether the battery 49 is in an overdischarged state. If and when the voltage corresponding to the discharge current of the batterg 49 is smaller than the voltage corresponding to the current of the 75% discharge, it is determined that the battery 49 is in an overdischarged state. If and when the decision at the determining step 701 is "YES", this means that the battery 49 has discharged more than 75% and accordingly the motor/generator 3 can not be run in the motoring mode using the power supply from the battery 49. Accordingly, at the following step 702 the microcomputer 5 sets the motoring mode stop flag MMST. On the other hand, when the decision at the determining step 701 is "NO", this means that the battery 49 has not reached yet the 75% discharge state and in such case the flag MMST is reset and then terminates the routine just as in case of execution of the step 702.

The routine following ⑪ is a routine for determining whether a regenerative power can be charged to the battery 49. More specifically, at the step 801 shown in FIG. 14B, the microcomputer 5 receives a voltage corresponding to the temperature detected by the temperature sensor, not shown, through the interface 54. The microcomputer 5 is responsive to the voltage to determine whether the temperature of the battery 49 exceeds a predetermined value, say 75° C. The above described predetermined value of the battery temperature is selected in consideration of the materials and the like of the battery case for use in the battery 49. If and when the decision at the determining step 801 is "YES", i.e. if and when the temperature of the battery 49 is higher than the above described predetermined value, than at the following step 802 the microcomputer 5 sets the generating mode stop flag GMST, thereby to terminate the routine. On the other hand, if and when the decision at the determining step 801 is "NO", i.e. the temperature of the battery 49 has not reached the above described predetermined value or the allowable maximum value, then at the following determining step 803 the microcomputer 5 determines whether the battery is in an overcharged state. More specifically, at the determining step 803, the microcomputer 5 receives a current value and voltage value corresponding to the 100% line in the FIG. 9 graph by referring to the data table 55. Then the current and the voltage of the battery 49 obtained from the interfaces 51 and 53 are compared with the current and voltage thus obtained from the data table 55, thereby to determine whether the battery is in an overcharged state. More specifically, in the case where the data obtained from the data table 55 is smaller as compared with the data obtained from the interfaces 51 and 53, it is determined that the battery 49 is in an overcharged state. If and when the decision at the determining step 803 is "YES", then at the following step 802 the microcomputer 5 sets the flag GMST. On the other hand, if and when the decision at the step 803 is "NO", then at the following step 804 the microcomputer 5 sets the flag GMST, thereby to terminate the routine.

Meanwhile, referring to FIG. 3, a display 65 and an output port 63 associated therewith may be provided as shown by the dotted line. The display 65 may be provided with display elements 65a, 65b and 65c adapted to be turned on or off responsive to the previously described flags MMST, EMST and GMST, respectively. Accordingly, an advantage is brought about that a driver can learn which mode can not be enabled.

In the foregoing description of the preferred embodiments of the present invention, a diesel engine was taken as an example of an internal combustion engine; however, it should be pointed out that the present invention can be equally applicable to a gasoline engine as another example of an internal combustion engine. In case of a gasoline engine, however, the fuel control 57 would comprise a carburetor opening degree controlling means for controlling an opening degree of a carburetor included in such engine.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for controlling a hybrid vehicle having wheels, comprising:
   an internal combustion engine having a throttle,
   throttle control means for controlling an opening degree of said throttle as a function of a given first control amount,
   an electric motor,
   a battery for supplying an electric power to said electric motor,
   motor control means for controlling said electric power fed from said battery to said electric motor as a function of a given second control amount,
   transmitting means for transmitting a driving power of at least said internal combustion engine and said electric motor to said wheels of said hybrid vehicle,
   speed adjustment operating means for being operated for speed adjustment of said hybrid vehicle,
   first data providing means for providing data concerning a relation of said first control amount with respect to the number of revolutions and torque of said internal combustion engine,
   second data providing means for providing data concerning a relation of said second control amount with respect to the number of revolutions and torque of said electric motor,
   revolution number providing means responsive to the movement of said hybrid vehicle for providing data concerning the number of revolutions determinable as a function of the speed of said movement of said hybrid vehicle and adaptable to the number of revolutions of said internal combustion engine and the number of revolutions of said electric motor,
   required torque data providing means responsive to the output of said speed adjustment operating means for providing data concerning a required torque determinable based on the number of revolutions obtained from said revolution number data providing means,
   first determining means for determining whether said number of revolutions obtained from said revolution number data providing means is within a predetermined range of said number of revolutions of said internal combustion engine for allowing for a running operation of said internal combustion engine when said number of revolutions obtained from said revolution number data providing means is deemed as said number of revolutions of said internal combustion engine,
   second determining means for determining whether said required torque exceeds a predetermined upper limit value of a predetermined torque range of said internal combustion engine for allowing for a running operation of said internal combustion engine when it is determined by said first determining means that said number of revolutions obtained from said revolution number data providing means is within said predetermined range of said number of revolutions of said internal combustion engine, and
   control means for providing said first control amount to said throttle control means by referring to said first data providing means so as to maximize said opening degree of said throttle of said internal combustion engine when it is determined by said second determining means that said required torque exceeds said predetermined upper limit value of said predetermined torque range of said internal combustion engine and for providing said second control amount to said motor control means by referring to said second data providing means so as to run said electric motor with a torque corresponding to the difference between said required torque and said predetermined upper limit value of said predetermined torque range of said internal combustion engine.

2. An apparatus for controlling a hybrid vehicle in accordance with claim 1, which further comprises
   third determining means for determining whether said required torque is smaller than a predetermined lower limit value of said predetermined torque range of said internal combustion engine for allowing for a running operation of said internal combustion engine when it is determined by said second determining means that said required torque is smaller than said predetermined upper limit value of said predetermined torque range of said internal combustion engine, and wherein
   said control means is further adapted for providing said first control amount to said throttle control means by referring to said first data providing means so as to use the torque of said internal combustion engine as said required torque when it is determined by said third determining means that said required torque is larger than said predetermined lower limit value of said predetermined torque range of said internal combustion engine.

3. An apparatus for controlling a hybrid vehicle in accordance with claim 1, which further comprises
   fourth determining means for determining whether said required torque exceeds a predetermined upper limit value of a predetermined torque range of said electric motor when it is determined by said second determining means that said required torque exceeds said predetermined upper limit value of said predetermined torque range of said internal combustion engine, and wherein
   said control means is further adapted for providing said second control amount to said motor control means by referring to said second data providing means so as to run said electric motor with said predetermined upper limit value of said predetermined torque range of said electric motor when it is determined by said fourth determining means that said required torque exceeds said predetermined upper limit value of said predetermined torque range of said electric motor.

4. An apparatus for controlling a hybrid vehicle in accordance with claim 1, wherein
said control means is further adapted for enabling a running operation of said electric motor when it is determined by said first determining means that the number of revolutions obtained from said revolution number data providing means is not within said predetermined range of said number of revolutions of said internal combustion engine.

5. An apparatus for controlling a hybrid vehicle in accordance with claim 4, which further comprises
fifth determining means for determining whether said required torque exceeds a predetermined upper limit of a predetermined torque range of said electric motor when it is determined by said first determining means that the number of revolutions obtained from said revolution number data providing means is not within said predetermined range of the number of revolutions of said internal combustion engine, and wherein
said control means is further adapted for providing said second control amount to said motor control means by referring to said second data providing means so as to maximize the torque of said electric motor when it is determined by said fifth determining means that said required torque exceeds, said predetermined upper limit value of said predetermined torque range of said electric motor.

6. An apparatus for controlling a hybrid vehicle in accordance with claim 5, wherein
said control means is further adapted for providing said second control amount to said motor control means by referring to said second data providing means so as to use said torque of said electric motor as said required torque when it is determined by said fifth determining means that said required torque is lower than said predetermined upper limit value of said predetermined torque range of said electric motor.

7. An apparatus for controlling a hybrid vehicle in accordance with claim 2, wherein
said electric motor is structured to be selectively operable as a generator, and which further comprises
generator control means for controlling a regenerative power obtained from said generator to said battery as a function of a given third control amount, and
third data providing means for providing data concerning a ralation of said third control amount with respect to the number of revolutions and torque of said generator, and wherein
said control means is further adapted for providng said first control amount to said throttle control means by referring to said first data providing means so as to run said internal combustion engine with said predetermined upper limit value of said predetermined torque range of said internal combustion engine when it is determined by said second determining means that said required torque is smaller than said predetermined lower limit value of said predetermined torque range of said internal combustion engine and for providing said third control amount to said generator control means by referring to said third data providing means so as to run said generator with a torque corresponding to the difference between said predetermined lower limit value of said predetermined torque range of said internal combustion engine and said required torque.

8. An apparatus for controlling a hybrid vehicle in accordance with claim 7, which further comprises
brake operating means for being operated for a brake operation of said hybrid vehicle,
required braking torque data providing means responsive to the output of said brake operating means for providing data concerning a required braking troque determinable by the number of revolutions obtained from said revolution number data providing means, and
sixth determining means for determining whether said required braking torque exceeds a predetermined upper limit value of a predetermined torque range of said generator, and wherein
said control means is further adapted for providing said third control amount to said generator control means so as to use the torque of said generator as said predetermined upper limit value of said predetermined torque range of said generator when it is determined by said sixth determining means that said required braking torque exceeds said predetermined upper limit value of said predetermined torque range of said generator.

9. An apparatus for controlling a hybrid vehicle in accordance with claim 8, wherein
said control means is further adapted for providing said third control amount to said generator control means by referring to said third data providing means so as to use the torque of said generator as said required braking torque when it is determined by said sixth determining means that said required braking torque is smaller than said predetermined upper limit value of said predetermined torque range of said generator.

10. An apparatus for controlling a hybrid vehicle in accordance with claim 1, wherein
said first determining means comprises
limit revolution number data providing means for providing data concerning a lower limit and upper limit values of said number of revolutions for allowing for a running operation of said internal combustion engine, and
means for comparing said number of revolutions obtained from said revolution number data providing means with said data concerning a lower limit and upper limit values of said number of revolutions.

11. An apparatus for controlling a hybrid vehicle in accordance with claim 10, wherein
said second determining means comprises upper limit internal combustion engine torque data providing means for providing data concerning an upper limit value of a predetermined torque range for allowing for a running operation of said internal combustion engine, and
said second determining means comprises means for comparing said required torque with said upper limit value of said predetermined torque range of said internal combustion engine.

12. An apparatus for contorlling a hybrid vehicle in accordance with claim 2, wherein
said third determining means comprises lower limit internal combustion engine torque data providing means for providing data concerning a lower limit value of said predetermined torque range for allowing for a running operation of said internal combustion engine, and means for comparing said required torque with said lower limit value of said predetermined torque range of said internal combustion engine.

13. An apparatus for controlling a hybrid vehicle in accordance with claim 3, wherein said fourth determining means comprises upper limit electric motor torque data providing means for providing data concerning said upper limit value of said predetermined torque range of said electric motor, and means for comparing said required torque with said upper limit value of said predetermined torque range of said electric motor.

14. An apparatus for controlling a hybrid vehicle in accordance with claim 8, wherein said sixth determining means comprises upper limit generator torque data providing means for providing data concerning said upper limit value of said predetermined torque range of said generator, and means for comparing said required braking torque with said upper limit value of said predetermined torque range of said generator.

15. An apparatus for controllng a hybrid vehicle in accordance with claim 1, which further comprises motor incapability flag providing means for providing a motor incapability flag representing that said electric motor is incapable of a running operation, and seventh determining means for determining whether said battery is in an overdischarged state, and wherein said control means is further adapted for setting said motor incapability flag when it is determined by said seventh determining means that said battery is in said overdischarged state and for resetting said motor incapability flag when it is determined by said seventh determining means that said battery is not in said overdischarged state, and which further comprises engine incapability flag providing means for providing engine incapability flag representing that said internal combustion engine is incapable of a running operation, and initiation incapable state determining means for determining whether said internal combustion engine is incapable of initiation, and wherein said control means is further adapted for setting said engine incapability flag when it is determined by said initiation incapability state determining means that said internal combustion engine is incapable of initiation.

16. An apparatus for controlling a hybrid vehicle in accordance with claim 15, which further comprises initiation means for initiating said internal combustion engine, initiation failure number detecting means for detecting the number of failures in initiation attempted by said initiation means, and wherein said control means is further adapted for setting said engine incapability flag when the number of failures in initiation has reached a predetermined number.

17. An apparatus for controlling a hybrid vehicle in accordance with claim 15, which further comprises eighth determining means for determining whether said motor incapability flag has been set, and wherein said control means is further adapted for rendering said internal combustion engine capable when it is determined by said eighth determining means that said motor incapability flag has been set.

18. An apparatus for controlling a hybrid vehicle in accordance with claim 17, which further comprises ninth determining means for determining whether said engine incapability flag has been set when it is determined by said eighth determining means that said motor incapability flag has been reset, and wherein said control means is further adapted for rendering both of said internal combustion engine and said electric motor capable when it is determined by said ninth determining means that said engine incapability flag has not been set.

19. An apparatus for controlling a hybrid vehicle in accordance with claim 18, wherein said control means is further adapted for rendering only said electric motor capable when it is determined by said ninth determining means that said engine incapability flag has been set.

20. An apparatus for controlling a hybrid ybrid vehicle in accordance with claim 15, wherein said seventh determining means comprises overdischarged state data providing means for providing data representing a relation of a limit value of a current and a limit value of a voltage showing an overcharged state of said battery and, means for comparing a current and voltage of said battery with said current and voltage limit values.

21. An apparatus for controlling a hybrid vehicle in accordance with claim 7, which further comprises generator incapability flag providing means for providing a generator incapability flag representing that said generator is incapabile of a running operation, and tenth determining means for determining whether the temperature of said battery exceeds a predetermined value, and wherein said control means is further adapted for setting said generator incapability flag when it is determined by said tenth determining means that the temperature of said battery exceeds said predetermined value and for resetting said generator incapability flag when it is determined by said tenth determining means that the temperature of said battery is lower than said predetermined value.

22. An apparatus for controlling a hybrid vehicle in accordance with claim 21, which further comprises motor incapability flag providing means for providing a motor incapability flag representing that said electric motor is incapable of a running operation, and seventh determining means for determining whether said battery is in an overdischarged state, and wherein said control means is further adapted for setting said motor incapability flag when it is determined by said seventh determining means that said battery is in said overdischarged state and for resetting said motor incapability flag when it is determined by said seventh determining means that said battery is not in said overdischarged state, and which further comprises eighth determining means for determining whether said motor incapability flag has been set, and eleventh determining means for determining whether said generator incapability flag has been set when it is determined by said eighth determining means that said motor incapability flag has been set, and wherein said control means is further adapted for rendering only said internal combustion engine capable when it is determined by said eleventh determining means that said generator incapability flag has been set.

23. An apparatus for controlling a hybrid vehicle in accordance with claim 22, wherein said control means is further adapted for rendering said internal combustion engine and said generator capable when it is determined by said eleventh determining means that said generator incapability flag has been reset.

24. An apparatus for controlling a hybrid vehicle in accordance with claim 22, which further comprises engine incapability flag providing means for providing an engine incapability flag representing that said internal combustion engine is incapable of a running operation, and initiation incapability detecting means for detecting whether said internal combustion engine is incapable of initiation, and wherein said control means is further adapted for setting said engine incapability flag when it is detected by said initiation incapability detecting means that said internal combustion engine is incapable of initiation, and which further comprises twelfth determining means for determining whether said engine incapability flag has been set when it is determined by said eight determining means that said motor incapability flag has been reset, and thirteenth determining means for determining whether said generator incapability flag has been set when it is determined by said twelfth determining means that said engine incapability flag has not been set, and wherein said control means is further adapted for rendering said internal combustion engine and said electric motor capable when it is determined by said thirteenth determining means that said generator incapability flag has been set.

25. An apparatus for controlling a hybrid vehicle in accordance with claim 24, wherein said control means is further adapted for rendering said internal combustion engine capable, and said motor or said generator when it is determined by said thirteenth determining means that said generator incapability flag has been reset.

26. An apparatus for controlling a hybrid vehicle in accordance with claim 21, wherein said eighth determining means comprises maximum temperature data providing means for providing data concerning an allowable maximum value of a temperature of said battery, and means for comparing the temperature of said battery with said allowable maximum temperature of said battery.

27. A method for controlling a hybrid vehicle having wheels, said hybrid vehicle comprising:

an internal combustion enginen having a throttle, throttle control means for controlling an opening degree of said throttle as a function of a given first control amount, an electric motor, a battery for supplying an electric power to said electric motor, motor control means for controlling said electric power fed from said battery to said electric motor as a function of a given second control amount, transmitting means for transmitting a driving power of at least said internal combustion engine and said electric motor to said wheels of said hybrid vehicle, and speed adjustment operating means for being operated for speed adjustment of said hybrid vehicle, said method comprising the step of providing data concerning a relation of said first control amount with respect to the number of revolutions and torque of said internal combustion engine, the step of providing data concerning a relation of said second control amount with respect to the number of revolutions and torque of said electric motor, the step of providing data concerning the number of revolutions determinable as a function of the speed of said movement of said hybrid vehicle and adaptable to the number of revolutions of said internal combustion engine and the number of revolutions of said electric motor, the step of providing data concerning a required torque determinable based on said number of revolutions provided at said revolution number data providing step responsive to the output of said speed adjustment operating means, the first determining step of determining whether said number of revolutions provided at said revolution number data providing step is within a predetermined range of said number of revolutions of said internal combustion engine for allowing for a running operation of said internal combustion engine when said number of revolutions provided at said revolution number data providing step is deemed as said number of revolutions of said internal combustion engine, the second determining step of determining whether said required torque exceeds a predetermined upper limit value of a predetermined torque range of said internal combustion engine for allowing for a running operation of said internal combustion engine when it is determined at said first determining step that said number of revolutions provided at said revolution number data providing step is within said predetermined range of said number of revolutions of said internal combustion engine, and the step of providing said first control amount to said throttle control means by referring to the data provided at said first data providing step so as to maximize said opening degree of said throttle of said internal combustion engine when it is determined at said second determining step that said required torque exceeds said predetermined upper limit value of said predetermined torque range of said internal combustion engine and for providing said second control amount to said motor control means by referring to the data provided at said second data providing step so as to run said electric motor with a torque corresponding to the difference between said required torque and said predetermined upper limit value of said predetermined torque range of said internal combustion engine.

28. A method for controlling a hybrid vehicle in accordance with claim 27, which further comprises
the third determining step of determining whether said required torque is larger than a predetermined lower limit value of said predetermined torque range of said internal combustion engine for allowing for a running operation of said internal combustion engine when it is determined at said second determining step that said required torque is smaller than said predetermined upper limit value of said predetermined torque range of said internal combustion engine, and
the step of providing said first control amount to said throttle control means by referring to the data provided at said first data providing step so as to use the torque of said internal combustion engine as said required torque when it is determined at said third determining step that said required torque is larger than said predetermined lower limit value of said predetermined torque range of said internal combustion engine.

29. A method for controlling a hybrid vehicle in accordance with claim 27, which further comprises
the fourth determining step of determining whether said required torque exceeds a predetermined upper limit value of a predetermined torque range of said electric motor when it is determined at said second determining step that said required torque exceeds said predetermined upper limit value of said predetermined torque range of said internal combustion engine, and
the step of providing said second control amount to said motor control means by referring to the data provided at said second data providing step so as to run said electric motor with said predetermined upper limit value of said predetermined torque range of said electric motor when it is determined at said fourth determining step that said required torque exceeds said predetermined upper limit value of said predetermined torque range of said electric motor.

30. A method for controlling a hybrid vehicle in accordance with claim 27, which further comprises
the step of enabling a running operation of said electric motor when it is determined at said first determining step that the number of revolutions provided at said revolution number data providing step is not within said predetermined range of said number of revolutions of said internal combustion engine.

31. A method for controlling a hybrid vehicle in accordance with claim 30, which further comprises
the fifth determining step of determining whether said required torque exceeds a predetermined upper limit of a predetermined torque range of said electric motor when it is determined at said first determining step that the number of revolutions provided at said revolution number data providing step is not within said predetermined range of the number of revolutions of said internal combustion engine, and
the step of providing said second control amount to said motor control means by referring to the data provided at said second data providing step so as to maximize the torque of said electric motor when it is determined at said fifth determining step that said required torque exceeds said predetermined upper limit value of said predetermined torque range of said electric motor.

32. A method for controlling a hybrid vehicle in accordance with claim 31, which further comprises
the step of providing said second control amount to said motor control means by referring to the data provided at said second data providing step so as to use said torque of said electric motor as said required torque when it is determined at said fifth determining step that said required torque is lower than said predetermined upper limit value of said predetermined torque range of said electric motor.

33. A method of controlling a hybrid vehicle in accordance with claim 28, wherein
said electric motor is structured to be selectively operable as a generator, and
said hybrid vehicle further comprises
generator control means for controlling a regenerative power obtained from said generator to said battery as a function of a given third control amount, and which further comprises
the step of providing data concerning a relation of said third control amount with respect to the number of revolutions and torque of said generator, and
the step of providing said first control amount to said throttle control means by referring to the data provided at said first data providing step so as to run said internal combustion engine with said predetermined upper limit value of said predetermined torque range of said internal combustion engine when it is determined at said second determining step that said required torque is smaller than said predetermined lower limit value of said predetermined torque range of said internal combustion engine and for providing said third control amount to said generator control means by referring to data provided at said third data providing step so as to run said generator with a torque corresponding to the difference between said predetermined lower limit value of said predetermined torque range of said internal combustion engine and said required torque.

34. A method for controlling a hybrid vehicle in accordance with claim 33, wherein said hybrid vehicle further comprises
brake operating means for being operated for a brake operation of said hybrid vehicle, and which further comprises
the step of providing data concerning a required braking torque determinable by the number of revolutions provided at said revolution number data providing step responsive to the output of said brake operating means,
the sixth determining step of determining whether said required braking torque exceeds a predetermined upper limit value of a predetermined torque range of said generator, and
the step of providing said third control amount to said generator control means so as to use the torque of said generator as said predetermined upper limit value of said predetermined torque range of said generator when it is determined at said sixth determining step that said required braking torque exceeds said predetermined upper limit value of said predetermined torque range of said generator.

35. A method for controlling a hybrid vehicle in accordance with claim 34, which further comprises the step of providing said third control amount to said generator control means by referring to the data provided at said third data providing step so as to use the torque of said generator as said required braking torque when it is determined at said sixth determining step that said required braking torque is smaller than said predetermined upper limit torque of said predetermined torque range of said generator.

* * * * *